US008282708B2

(12) United States Patent
Spiegelman et al.

(10) Patent No.: US 8,282,708 B2
(45) Date of Patent: Oct. 9, 2012

(54) METHOD OF PRODUCING HIGH PURITY STEAM

(75) Inventors: Jeffrey J. Spiegelman, San Diego, CA (US); Richard D. Blethen, Vista, CA (US)

(73) Assignee: RASIRC, San Diego, CA (US)

( * ) Notice: Subject to any disclaimer, the term of this patent is extended or adjusted under 35 U.S.C. 154(b) by 884 days.

(21) Appl. No.: 12/066,254

(22) PCT Filed: Sep. 12, 2006

(86) PCT No.: PCT/US2006/035790
§ 371 (c)(1),
(2), (4) Date: Jul. 14, 2008

(87) PCT Pub. No.: WO2007/058698
PCT Pub. Date: May 24, 2007

(65) Prior Publication Data
US 2009/0145847 A1      Jun. 11, 2009

Related U.S. Application Data

(60) Provisional application No. 60/716,727, filed on Sep. 13, 2005, provisional application No. 60/798,805, filed on May 4, 2006.

(51) Int. Cl.
*B01D 53/22* (2006.01)
*B01D 61/00* (2006.01)
*B01D 3/02* (2006.01)

(52) U.S. Cl. ............... 95/52; 95/19; 95/22; 96/4; 96/8; 96/10; 96/11; 96/12; 96/421; 210/640; 210/664; 210/741

(58) Field of Classification Search ............... 95/19, 22, 95/46, 52; 96/4, 6, 7, 8, 10, 11, 12, 421; 210/640, 664, 137, 741, 321.6, 321.84, 321.88
See application file for complete search history.

(56) References Cited

U.S. PATENT DOCUMENTS 4,725,359 A * 2/1988 Ray .................. 210/640
(Continued)

FOREIGN PATENT DOCUMENTS

EP     0 676 231 A1   11/1995
(Continued)

OTHER PUBLICATIONS

Extended European Search Report from PCT/US2006035790.
(Continued)

*Primary Examiner* — Jason M Greene
(74) *Attorney, Agent, or Firm* — Connolly Bove Lodge & Hutz LLP

(57) ABSTRACT

Methods for the purification of steam, systems for purifying steam, methods for measuring and/or controlling steam flow rates, and uses for purified steam are provide. Also provided are substantially gas-impermeable membranes, such as perfluorinated ionomers (e.g., perfluoroethylene-sulfonic-acid/tetrafluoroethylene membranes), having a high ratio of water vapor permeation relative to gas permeation through the membrane. Also provided are methods of operation of such membranes at relatively high operating temperatures for the purification of steam and for operation of such membranes at relatively low temperature and sub-atmospheric pressures for the purification of steam. In a preferred embodiment, the system 400 for purifying steam comprises heater 404 for creating a source of a steam feed, and a purification device 416 for housing a substantially gas-impermeable membrane 424. In the operation of system 400, water, such as deionized water, is added to vessel 402 to provide a source of the steam feed.

36 Claims, 13 Drawing Sheets

U.S. PATENT DOCUMENTS

| | | | |
|---|---|---|---|
| 4,857,082 A * | 8/1989 | DiMartino et al. | 95/19 |
| 4,879,041 A * | 11/1989 | Kurokawa et al. | 210/640 |
| 5,051,114 A | 9/1991 | Nemser et al. | |
| 5,073,268 A | 12/1991 | Saito et al. | |
| 5,096,584 A * | 3/1992 | Reddy et al. | 210/321.74 |
| 5,104,425 A | 4/1992 | Rao et al. | |
| 5,531,902 A | 7/1996 | Gallup | |
| 5,849,195 A | 12/1998 | Haenel et al. | |
| 5,964,922 A | 10/1999 | Keskar et al. | |
| 6,010,614 A | 1/2000 | Keskar et al. | |
| 6,354,443 B1 | 3/2002 | Moya | |
| 6,537,465 B2 | 3/2003 | Gottzmann et al. | |
| 6,913,696 B1 | 7/2005 | Korngold et al. | |
| 7,866,637 B2 * | 1/2011 | Van Der Net | 261/104 |
| 2005/0056594 A1 | 3/2005 | Nunez | |

FOREIGN PATENT DOCUMENTS

| | | |
|---|---|---|
| JP | 63-54420 | 3/1988 |
| JP | 63-283707 | 11/1988 |
| JP | 07-275637 | 10/1995 |
| JP | 07275676 | 10/1995 |
| JP | 09-024249 | 1/1997 |
| JP | 2002-540044 | 11/2002 |
| WO | WO 00/56426 | 9/2000 |

OTHER PUBLICATIONS

Asaeda M; Du L D: Separation of Alcohol/Water Gaseous Mixtures by Thin Ceramic Membrane; Journal of Chemical Engineering of Japan, Society of Chemical Engineers. Tokyo, JP, No. 19, Jan. 1, 1986, pp. 72-77.

JP 2008-531312 Notice of Reasons for Rejection dated Mar. 30, 2011 (with English translation).

Fernandez, "Perfluorinated ionomers," Polymer Data Handbook, Oxford University Press, pp. 233-238 (1999).

"Phyiscal Properties for Nafion Membrane—Types NR and NRE," DuPont FLuoroproducts Confidential, E.I. du Pont de Nemours & Company (2004).

Ludvigsson, "Materials for Future Power Sources," Ph.D. Dissertation, ACTA Universitatis Upsaliensis, Uppsala, Ch. 3.3, p. 17 (2000).

"Heat Seal Repair of NAFION Membranes," Technical Information Bulletin 91-02, E.I. du Pont de Nemours & Company (2000).

"Heat Sealing Machine," Technical Information Bulletin 91-01, E.I. du Pont de Nemours & Company (1991).

"Heat Sealing Nation Membranes," Technical Information Bulletin 91-01 Rev. Dec. 2003, E.I. du Pont de Nemours & Company (2003).

* cited by examiner

|  | Source DI | Source Steam | Purified Steam |
|---|---|---|---|
| Total Metals | 19.8 | 0.15 | 0.009 |
| Total Organic Carbon | 1200 | 380 | 22 |
| Total Silica | 28 | 4.3 | 0.7 |
| Urea | 2200 | 48 | 2.6 |
| Ammonium | 1468 | 1117 | 116 |

Figure 10

METHOD OF PRODUCING HIGH PURITY STEAM

RELATED APPLICATIONS

This application is the U.S. National Phase under 35 U.S.C. §371 of International Application PCT/US2006/035790, filed Sep. 12, 2006, which claims the benefit of U.S. provisional application Ser. No. 60/716,727, filed Sep. 13, 2005; and U.S. provisional application Ser. No. 60/798,805, filed May 4, 2006, the disclosures of which are hereby expressly incorporated by reference in there entirety and are hereby expressly made a portion of this application.

FIELD OF THE INVENTION

A method for producing ultrapure steam is provided. The method is based on the ability to generate a high rate of diffusion of water vapor through a nonporous ionic membrane. In order to have a high diffusion rate, the pressure differential across the membrane is preferably from about 0.5 kPa or less to about 350 kPa or more. To generate such high pressure differentials for water vapor across a membrane, the operating water vapor pressure is fully saturated or supersaturated at temperatures approaching or exceeding 100° C. Alternatively, lower temperatures can be used if the system is operated at subatmospheric pressures. In these cases, temperatures which approach 10° C. or less can be used. For optimal operation of membranes at temperatures significantly above ambient, the side of the membrane to which unpurified water vapor is provided (the supply side of the membrane) is preferably saturated with water vapor.

BACKGROUND OF THE INVENTION

High purity steam is used in many applications in current advanced technology processes, including processes employed in semiconductor manufacturing, production of medical gases, oil recovery, and fuel cell technology. Because high purity steam introduces minimal impurities, such as toxic waste byproducts, into a process, it can be used, e.g., for the oxidation of silicon, in the production of thin gate oxides, growth of metal oxides or other thin films on semiconductor surfaces (e.g., in the electronics and semiconductor industries), in ultra-high purity cleaning processes, and in photo-resist removal for photolithographic processes.

In the pharmaceutical and biotechnology industries, high purity steam is used for sterilization, or can be condensed to yield high purity water. Although generally more expensive than standard de-ionization processes, the production of liquid water from high purity steam can yield a product having reduced amounts of, e.g., prions, viruses, allergens, proteins, bacteria, and other biologically active macromolecules or substances present in biological systems that may not be effectively removed by standard water de-ionization processes. Additionally water containing substantially reduced levels of inorganic substances, such as borates and silicates that commonly pass through de-ionized water systems, or metallic substances such as iron, nickel, chrome, copper, and other toxic metals characteristic of water produced from metal stills, can be obtained from ultrapure steam.

Typically, steam for technological and industrial applications is produced by simply boiling de-ionized water or by reacting gaseous hydrogen and oxygen to yield water vapor. In the latter case, the production of pure steam is practically impossible due to the presence of residual oxygen and/or hydrogen remaining in the product water vapor. Removing these components often requires additional expensive and complex separation processes. Additionally, high concentrations of gaseous hydrogen are often required for the synthesis reaction with oxygen, which is conducted at high temperatures well above the explosive limit of hydrogen (approximately 8% at a pressure of approximately 100 kPa). Steam synthesis processes operated under such conditions can present dangerous safety problems if not properly conducted.

The simple boiling of high purity de-ionized water to yield steam can avoid the problems and dangers inherent in the direct reaction of hydrogen and oxygen to yield steam. However, removing dissolved gases can be difficult and often requires multiple boiling/condensation cycles in a hermetically sealed environment, which can be expensive. Moreover, aerosols containing materials that are not normally volatile, such as salts or metals, can be produced during the boiling process. When steam containing such aerosols is condensed at the point of use, these impurities may be incorporated into the condensate and can add unwanted impurities to the liquid water, and therefore, higher costs due to subsequent process steps required for the removal of the impurities. Because ultrapure water itself is very corrosive, whatever material is used to construct the boiler (e.g., quartz, stainless steel, glass, etc.) can be dissolved into the steam and then entrained in aerosols.

In processes where steam is used to activate toxic materials, such as steam injection for oil recovery, the saturated steam may contain byproducts from the injection that should not be released into the environment. Purification of the steam to remove hydrocarbons, sulfides, and other toxic contaminants allows for direct venting to atmosphere of the purified steam.

SUMMARY OF THE INVENTION

There is a need for the development of new methods and devices to produce high purity steam that overcome the limitations and disadvantages of the prior art methods.

Accordingly, in a first aspect a method of purifying steam is provided, comprising passing a steam feed through at least one substantially gas-impermeable ion exchange membrane at an operating temperature and an operating pressure to form a purified steam having a greater purity than the steam feed by removal of a contaminant, wherein the steam feed is saturated at the operating temperature and the operating pressure.

In an embodiment of the first aspect, the purified steam is at sub-atmospheric pressure.

In an embodiment of the first aspect, the feed steam originates from an external process.

In an embodiment of the first aspect, the feed steam is a waste by-product from a commercial process or an industrial process.

In an embodiment of the first aspect, the ion exchange membrane comprises a functional group selected from the group consisting of sulfonic acid, carboxylic acid, phenols, and salts thereof.

In an embodiment of the first aspect, the ion exchange membrane comprises a polymer having an Equivalent Weight of at least 300.

In an embodiment of the first aspect, the ion exchange membrane comprises a polymer having an Equivalent Weight of at least 1000.

In an embodiment of the first aspect, the ion exchange membrane comprises a polymer having an Equivalent Weight of at least 2000.

In an embodiment of the first aspect, the ion exchange membrane is impregnated with an inorganic oxide.

In an embodiment of the first aspect, the ion exchange membrane comprises a fluorine-containing polymer.

In an embodiment of the first aspect, the ion exchange membrane is copolymer of perfluorinated ethylene and perfluorinated vinyl comprising an acid group, or a salt thereof.

In an embodiment of the first aspect, the acid group is selected from the group consisting of sulfonic acid and carboxylic acid.

In an embodiment of the first aspect, the salt is selected from the group consisting of alkali metal salts and alkaline earth metal salts.

In an embodiment of the first aspect, the membrane comprises a copolymer of perfluorinated ethylene and perfluorinated vinyl comprising a sulfonic acid group or a potassium salt thereof.

In an embodiment of the first aspect, the membrane comprises a copolymer of perfluorinated ethylene and perfluorinated vinyl comprising a carboxylic acid group or a potassium salt thereof.

In an embodiment of the first aspect, the membrane has a gas leak rate of less than $10^{-3}$ cm$^3$/cm$^2$/s under a standard temperature and pressure.

In an embodiment of the first aspect, the membrane has a gas leak rate of less than $10^{-6}$ cm$^3$/cm$^2$/s under a standard temperature and pressure.

In an embodiment of the first aspect, the membrane has a ratio of water vapor permeability to an impurity gas permeability of at least 100:1

In an embodiment of the first aspect, the membrane has a ratio of water vapor permeability to an impurity gas permeability of at least 1000:1.

In an embodiment of the first aspect, the membrane has a ratio of water vapor permeability to an impurity gas permeability of at least 10000:1.

In an embodiment of the first aspect, the membrane has a ratio of water vapor permeability to an impurity gas permeability of at least 1000000:1.

In an embodiment of the first aspect, the passing comprises contacting a first surface of the at least one membrane with the steam feed and allowing the purified steam to flow from an opposing second surface of the membrane.

In an embodiment of the first aspect, the method further comprises contacting the first surface with a purge flow of steam feed that does not substantially pass through the membrane.

In an embodiment of the first aspect, the purge flow of steam feed is a portion of the steam feed.

In an embodiment of the first aspect, the method further comprises controlling the rate of the purge flow.

In an embodiment of the first aspect, the method further comprises maximizing the flow rate of steam passing through the at least one membrane by controlling the rate of the purge flow.

In an embodiment of the first aspect, the rate of the purge flow is controlled by a valve positioned downstream from the membrane.

In an embodiment of the first aspect, the rate of the purge flow is controlled by a valve positioned upstream from the membrane.

In an embodiment of the first aspect, the rate of the purge flow is controlled by a valve positioned upstream from the membrane, wherein the valve controls the upstream pressure by venting the upstream pressure.

In an embodiment of the first aspect, the purge flow is maintained continuously.

In an embodiment of the first aspect, the purge flow is maintained intermittently.

In an embodiment of the first aspect, the method further comprises maintaining a constant steam pressure differential across the thickness of the membrane.

In an embodiment of the first aspect, the steam pressure differential is maintained by controlling the pressure of the steam feed by upstream valve.

In an embodiment of the first aspect, the steam pressure differential is maintained by controlling the pressure of the steam feed by varying the upstream temperature.

In an embodiment of the first aspect, the flow rate of the steam feed is controlled by a valve positioned downstream from the membrane.

In an embodiment of the first aspect, a porous support contacts the second surface of the membrane.

In an embodiment of the first aspect, the membrane comprises an array of membranes positioned substantially parallel with respect to each other.

In an embodiment of the first aspect, the array of membranes comprises an array of tubes.

In an embodiment of the first aspect, the array of membranes comprises an array of planar sheets.

In an embodiment of the first aspect, each of the membrane has a thickness of from about 0.5 microns to about 2000 microns.

In an embodiment of the first aspect, each of the membrane has a thickness of from about 0.5 microns to about 200 microns.

In an embodiment of the first aspect, each of the membrane has a thickness of from about 0.5 microns to about 100 microns.

In an embodiment of the first aspect, each of the membrane has a thickness of from about 0.5 microns to about 50 microns.

In an embodiment of the first aspect, the steam feed has a purity of from about 80% to about 99% by weight relative to the total weight of the steam feed.

In an embodiment of the first aspect, the steam feed has a purity of from about 85% to about 99% by weight relative to the total weight of the steam feed.

In an embodiment of the first aspect, the steam feed has a purity of from about 95% to about 99.9% by weight relative to the total weight of the steam feed.

In an embodiment of the first aspect, the purified steam has a purity of at least about 90% by weight.

In an embodiment of the first aspect, the purified steam has a purity of at least about 99% by weight.

In an embodiment of the first aspect, the purified steam has a purity of at least about 99.9% by weight.

In an embodiment of the first aspect, the purified steam has a purity of at least about 99.99% by weight.

In an embodiment of the first aspect, the purified steam has a purity of at least about 99.999% by weight.

In an embodiment of the first aspect, the purified steam has a purity of at least about 99.9999% by weight.

In an embodiment of the first aspect, a reduction of the contaminant content of said steam feed to not more than 1 ppm is obtained.

In an embodiment of the first aspect, a reduction of the contaminant content of said steam feed to not more than 1 ppb is obtained.

In an embodiment of the first aspect, a reduction of the contaminant content of said steam feed to not more than 100 ppt.

In an embodiment of the first aspect, a reduction of the contaminant content of said steam feed to not more than 1 ppt is obtained.

In an embodiment of the first aspect, the contaminant comprises a metallic species.

In an embodiment of the first aspect, the contaminant comprises at least one species selected from the group consisting of borate, silicate, phosphate, and sulfate.

In an embodiment of the first aspect, the contaminant comprises an organic species.

In an embodiment of the first aspect, the contaminant comprises at least one species selected from the group consisting of ammonia, urea, and nitrogen containing species.

In an embodiment of the first aspect, the contaminant is gaseous.

In an embodiment of the first aspect, the contaminant comprises at least one species selected from the group consisting of nitrogen, oxygen, carbon monoxide, carbon dioxide, hydrogen, methane, ethane, hydrocarbons, hydrogen sulfide, $SO_x$, and $NO_x$.

In an embodiment of the first aspect, the contaminant comprises a protic polar species.

In an embodiment of the first aspect, the contaminant comprises an alkaline species.

In an embodiment of the first aspect, the contaminant comprises a particulate species.

In an embodiment of the first aspect, wherein the contaminant comprises a biologically active material.

In an embodiment of the first aspect, the contaminant comprises at least one material selected from the group consisting of mold, mold spores, prions, viruses, allergens, proteins, and bacteria.

In an embodiment of the first aspect, the feed steam is at sub-atmospheric pressure.

In an embodiment of the first aspect, the steam feed is passed through the membrane at a temperature of from about 10° C. to 300° C.

In an embodiment of the first aspect, the steam feed is passed through the membrane at a temperature of from about 10° C. to 100° C.

In an embodiment of the first aspect, the steam feed is passed through the membrane at a temperature of from about 80° C. to 300° C.

In an embodiment of the first aspect, the steam feed is passed through the membrane at a temperature of from about 100° C. to 300° C.

In an embodiment of the first aspect, the steam feed is passed through the membrane at a temperature of from about 150° C. to 300° C.

In an embodiment of the first aspect, the steam feed is passed through the membrane at a temperature of from about 100° C. to 160° C.

In an embodiment of the first aspect, the steam feed is passed through the membrane at a temperature of from about 100° C. to 150° C.

In an embodiment of the first aspect, the method further comprises a step of prefiltering out at least one species selected from the group consisting of alcohols, organic acids, ketones, hydroxyl containing compounds, and sulfur containing compounds.

In an embodiment of the first aspect, the method is for growing an oxide on a semiconductor surface.

In an embodiment of the first aspect, the method is for removing photoresist from a semiconductor wafer.

In an embodiment of the first aspect, the method is for use in removing contamination from semiconductor wafers.

In an embodiment of the first aspect, the method is for use in removing contamination from injected steam used for recovery of petroleum.

In an embodiment of the first aspect, the method is for use in removing contamination from exhausted steam prior to release into the environment or direct venting to atmosphere.

In an embodiment of the first aspect, the method is for use in generating clean steam for pharmaceutical use.

In an embodiment of the first aspect, the method is for generating ultrapure water for pharmaceutical use.

In a second aspect, a system for purifying steam is provided, comprising a source of steam feed; a first passageway for directing the source of steam feed to one surface of at least one substantially gas-impermeable ion exchange membrane; and a second passageway for directing purified steam away from an opposing surface of the substantially gas-impermeable membrane.

In an embodiment of the second aspect, the source of steam feed comprises water contained in a vessel associated with a heater.

In an embodiment of the second aspect, the system further comprises a purge flow of steam feed contacting the first surface that does not pass through the membrane.

In an embodiment of the second aspect, the system further comprises a third passageway to direct the purge flow of steam feed away from the membrane.

In an embodiment of the second aspect, the system further comprises a valve or an orifice, wherein the valve or orifice is in association with the third passageway, for controlling the flow rate of the purge flow.

In an embodiment of the second aspect, the system further comprises a valve in association with the second passageway, for controlling the flow rate of the purified steam.

In an embodiment of the second aspect, the system further comprises a valve in association with the first passageway, for controlling the flow rate of the steam feed.

In an embodiment of the second aspect, the system further comprises a porous support contacting the second surface of the membrane.

In an embodiment of the second aspect, the system further comprises a valve and water level control switch to maintain water within the system.

In an embodiment of the second aspect, the system further comprises a parallel leg to the steam feed to monitor water level within the system.

In an embodiment of the second aspect, the system further comprises a heater, a pressure transducer and a controller to maintain a correct differential pressure across the membrane.

In an embodiment of the second aspect, the system farther comprises a passage way that connects at least one of the first passage way, the second passage way, and the third passage way to a subatmospheric pressure.

In an embodiment of the second aspect, the system further comprises a prefilter to remove at least one species selected from the group consisting of organic alcohols, aldehydes, organic acids, other organic molecules, and sulfur containing compounds.

In an embodiment of the second aspect, the system further comprises a prefilter to remove ionic molecules.

In an embodiment of the second aspect, the system further comprises a prefilter to remove biological matter.

In an embodiment of the second aspect, the system further comprises a prefilter to remove inorganic matter.

In a third aspect, a method for purifying steam is provided, comprising contacting a first surface of a perfluorosulfonic acid/tetrafluoroethylene copolymer membrane with steam feed; collecting a purified steam from an opposing second surface of the perfluorosulfonic acid/tetrafluoroethylene copolymer membrane; and purging the first surface with at least a portion of the steam feed, such that a volume of purified steam is less than a volume of the steam feed.

In an embodiment of the third aspect, the steam feed has a purity of at least 90%.

In an embodiment of the third aspect, the steam feed has a purity of at least 99%.

In an embodiment of the third aspect, the perfluorosulfonic acid/tetrafluoroethylene copolymer membrane is operated at a temperature of from 10° C. to 300° C.

In an embodiment of the third aspect, the perfluorosulfonic acid/tetrafluoroethylene copolymer membrane is operated at a temperature of from 10° C. to 100° C.

In an embodiment of the third aspect, the perfluorosulfonic acid/tetrafluoroethylene copolymer membrane is operated at a temperature of from 80° C. to 300° C.

In an embodiment of the third aspect, the perfluorosulfonic acid/tetrafluoroethylene copolymer membrane is operated of from 100° C. to 300° C.

In an embodiment of the third aspect, the perfluorosulfonic acid/tetrafluoroethylene copolymer membrane is operated of from 100° C. to 150° C.

In an embodiment of the third aspect, the perfluorosulfonic acid/tetrafluoroethylene copolymer membrane has a thickness of from 0.5 microns to 2000 microns.

In an embodiment of the third aspect, the second surface of the perfluorosulfonic acid/tetrafluoroethylene copolymer membrane is supported by a porous structure, and wherein a quantity of purified steam is collected subsequent to transport through the porous structure.

In an embodiment of the third aspect, the porous structure is selected from the group consisting of polymers, ceramics, and metals.

In an embodiment of the third aspect, the porous structure is selected from the group consisting of polytetrafluoroethylene, quartz, and 316L stainless steel.

In a fourth aspect, a method for purifying steam is provided, comprising contacting a first surface of a perfluorocarboxylic acid/tetrafluoroethylene copolymer membrane with a steam feed; collecting a purified steam from an opposing second surface of the perfluorocarboxylic acid/tetrafluoroethylene copolymer membrane; and purging the first surface with at least a portion of the steam feed, such that a volume of purified steam is less than a volume of the steam feed.

In an embodiment of the fourth aspect, the quantity of steam feed has a purity of at least 90%.

In an embodiment of the fourth aspect, the quantity of steam feed has a purity of at least 99%.

In an embodiment of the fourth aspect, the perfluorocarboxylic acid/tetrafluoroethylene copolymer membrane is exposed to a temperature of from 10° C. to 300° C. during operation.

In an embodiment of the fourth aspect, the perfluorocarboxylic acid/tetrafluoroethylene copolymer membrane is exposed to a temperature of from 10° C. to 100° C. during operation.

In an embodiment of the fourth aspect, the perfluorocarboxylic acid/tetrafluoroethylene copolymer membrane is exposed to a temperature of from 80° C. to 300° C. during operation.

In an embodiment of the fourth aspect, the perfluorocarboxylic acid/tetrafluoroethylene copolymer membrane is exposed to a temperature of from 100° C. to 300° C. during operation.

In an embodiment of the fourth aspect, the perfluorocarboxylic acid/tetrafluoroethylene copolymer membrane is exposed to a temperature of from 100° C. to 150° C. during operation.

In an embodiment of the fourth aspect, the perfluorocarboxylic acid/tetrafluoroethylene copolymer membrane has a thickness of from 0.5 microns to 2000 microns.

In an embodiment of the fourth aspect, the second surface of the perfluorocarboxylic acid/tetrafluoroethylene copolymer membrane is supported by a porous structure, and wherein a quantity of purified steam is collected subsequent to transport through the porous structure.

In a fifth aspect, a method for measuring a steam flow rate is provided, comprising contacting a first surface of a perfluorosulfonic acid/tetrafluoroethylene copolymer membrane with steam at a first pressure; collecting steam from an opposing second surface of the perfluorosulfonic acid/tetrafluoroethylene copolymer membrane at a second pressure; measuring the first pressure and the second pressure; and determining a steam mass flow rate from the measurement of the first pressure and the second pressure.

In an embodiment of the fifth aspect, the first pressure and the second pressure are sub-atmospheric.

In a sixth aspect, a method for controlling a steam flow rate is provided, comprising contacting a first surface of a perfluorosulfonic acid/tetrafluoroethylene copolymer membrane with steam at a first pressure; collecting steam from an opposing second surface of the perfluorosulfonic acid/tetrafluoroethylene copolymer membrane at a second pressure; measuring the first pressure and the second pressure; determining a difference between the first pressure and the second pressure; determining a steam mass flow rate from the difference; and altering the difference until the steam mass flow rate matches a predetermined value.

In an embodiment of the sixth aspect, the first pressure and the second pressure are sub-atmospheric.

In a seventh aspect, a method for measuring a steam flow rate is provided, comprising contacting a first surface of a perfluorosulfonic acid/tetrafluoroethylene copolymer membrane with steam at a first pressure; collecting steam from an opposing second surface of the perfluorosulfonic acid/tetrafluoroethylene copolymer membrane at a second pressure; measuring the first pressure and the second pressure; and determining a steam mass flow rate from measurements of the first pressure and the second pressure.

In an embodiment of the seventh aspect, the first pressure and the second pressure are sub-atmospheric.

In an eighth aspect, a method for the control of steam flow rates is provided, comprising contacting a first surface of a perfluorosulfonic acid/tetrafluoroethylene copolymer membrane with steam at a first pressure; collecting steam from an opposing second surface of the perfluorosulfonic acid/tetrafluoroethylene copolymer membrane at a second pressure; measuring the first pressure and the second pressure; determining a difference between the first pressure and the second pressure; determining a steam mass flow rate from the difference; and altering the difference until the steam mass flow rate matches a predetermined value.

In an embodiment of the eighth aspect, the first pressure and the second pressure are sub-atmospheric.

BRIEF DESCRIPTION OF THE DRAWINGS

The accompanying drawings, which are incorporated in and constitute a part of this specification, illustrate several preferred embodiments.

FIG. 10 is a table of representative purified steam test data for the removal of several contaminants.

DETAILED DESCRIPTION OF THE PREFERRED EMBODIMENTS

Figure 1:
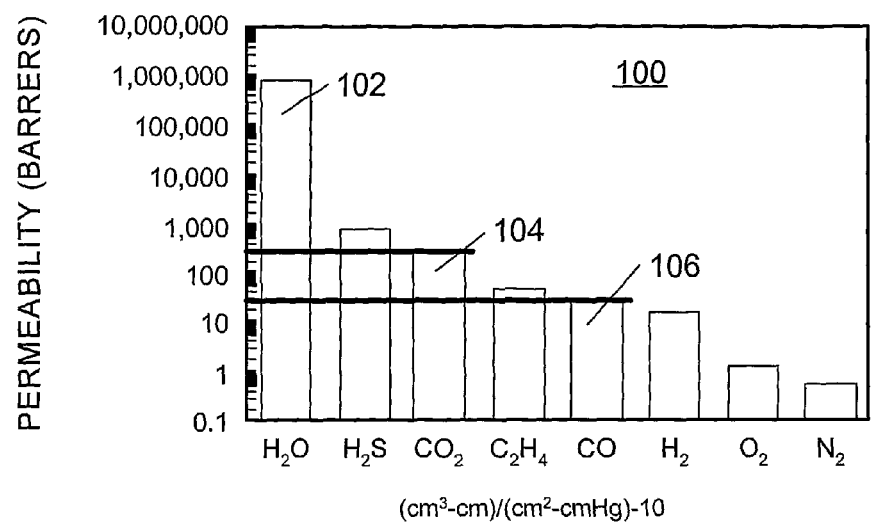
FIG. 1 is a chart showing the relative permeability of NAFION® membranes for selected gas molecules.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Purified Steam

A method of purifying steam is provided, comprising passing a steam feed through at least one substantially gas-impermeable ion exchange membrane to form a purified steam having a greater purity than the steam feed.

The term "steam" as used herein is a broad term, and is to be given its ordinary and customary meaning to a person of ordinary skill in the art (and is not to be limited to a special or customized meaning), and refers without limitation to a gaseous mixture comprising saturated water vapor. The term "steam feed" as used herein is a broad term, and is to be given its ordinary and customary meaning to a person of ordinary skill in the art (and is not to be limited to a special or customized meaning), and refers without limitation to a steam having at least one impurity, e.g., any solid, liquid, or gas other than water vapor. Exemplary impurities include, but are not limited to, aerosols, particles, and gases other than water vapor (e.g., hydrogen, nitrogen, oxygen, carbon monoxide, carbon dioxide, hydrogen sulfide, hydrocarbons, and other volatile organic compounds), biological materials including mold, mold spores, viruses, prions, macromolecules, bacteria, metals, and ionic materials. One of ordinary skill in the art can readily appreciate that the amount of impurities can be relative and acceptable impurity levels can be determined by the ultimate application for the steam. In one embodiment, the steam feed contains one or more impurities in an amount greater than about 1 ppb of the gaseous mixture (e.g., either for one particular impurity, or total impurities), such as an amount greater than about 10, 50 100, 150, 200, 250, 300, 350, 400, 450, 500, 550, 600, 650, 700, 750, 800, 850, 900, or 950 ppb; or an amount greater than about 110, 50 100, 150, 200, 250, 300, 350, 400, 450, 500, 550, 600, 650, 700, 750, 800, 850, 900, or 950 ppm; or even an amount greater than about 1, 2, 3, 4, 5, 6, 7, 8, 9, or 10% by weight relative to the total weight of the steam.

In another embodiment, the steam feed has a purity (i.e., a percent water content) of from about 80% by weight or less to about 99% by weight or more relative to the total weight of the steam feed, including a water content of from about 81, 82, 83, 84, 85, 86, 87, 88, or 89% by weight to about 99% by weight or more, or even a water content of from about 90, 91, 92, 93, 94, 95, 96, 97, or 98% to about 99% by weight or more relative to the total weight of the steam feed.

The term "purified steam" as used herein is a broad term, and is to be given its ordinary and customary meaning to a person of ordinary skill in the art (and is not to be limited to a special or customized meaning), and refers without limitation to steam having a purity (i.e., a percent water content) greater than that of the steam feed. The purified steam can be superheated to prevent condensation or saturation. In one embodiment, the purified steam has a purity of about 90% by weight or greater relative to the total weight of the steam, such as a purity of at least about 91, 92, 93, 94, 95, 96, 97, 98, or 99% by weight, or a purity of at least about 99.1, 99.2, 99.3, 99.4, 99.5, 99.6, 99.7, 99.8, or 99.9% by weight, or a purity of at least about 99.91, 99.92, 99.93, 99.94, 99.95, 99.96, 99.97, 99.98, or 99.99% by weight, or a purity of at least 99.991, 99.992, 99.993, 99.994, 99.995, 99.996, 99.997, 99.998, or 99.999% by weight, or a purity of at least about 99.9991, 99.9992, 99.9993, 99.9994, 99.9995, 99.9996, 99.9997, 99.9998, or 99.9999% by weight.

In another embodiment, the purified steam has a purity (i.e., a percent water content) of at least about 99.99999% by weight (100 ppb), a purity of at least 99.999999% by weight (10 ppb), a purity of at least 99.9999999% by weight (1 ppb), or a purity of at least 99.99999999% by weight (1 ppt).

While it is generally preferred to employ the methods and devices of the preferred embodiments to purify steam, they can also be employed to purify, e.g., ammonia and alcohols. The methods and devices can also be employed to dehumidify or humidify gases, or to remove aldehydes or ketones from a feed stream via conversion to alcohol by enolization.

The Separation Membrane

In one embodiment, the steam feed is purified by passing the feed through a substantially gas-impermeable ion exchange membrane. The term "substantially gas-impermeable membrane" as used herein is a broad term, and is to be given its ordinary and customary meaning to a person of ordinary skill in the art (and is not to be limited to a special or customized meaning), and refers without limitation to a membrane that is permeable to water vapor but relatively impermeable to other gases such as, but not limited to, hydrogen, nitrogen, oxygen, carbon monoxide, carbon dioxide, hydrogen sulfide, hydrocarbons (e.g., methane, ethane), volatile acids and bases, refractory compounds, and other volatile organic compounds. Gas impermeability can be determined by the "leak rate" of the membrane for a specific gaseous species. The term "leak rate" as used herein is a broad term, and is to be given its ordinary and customary meaning to a person of ordinary skill in the art (and is not to be limited to a special or customized meaning), and refers without limitation to the volume of a particular gas that penetrates the membrane surface area per unit of time. For example, a substantially gas-impermeable membrane has a low leak rate of gases other than water vapor, such as a leak rate of less than about $10^{-3}$ cm$^3$/cm$^2$/s under standard temperature and pressure (i.e., conditions at sea level). Alternatively, a "substantially gas-impermeable" membrane can be identified by a ratio of the permeability of water vapor compared to the permeability of other gases. Preferably, the substantially gas-impermeable membrane is more permeable to water vapor than to other gases by a ratio of at least about 10,000:1, such as a ratio of at least about 20,000:1, 30,000:1, 40,000:1, 50,000:1, 60,000:1, 70,000:1, 80,000:1, 90,000:1 or a ratio of at least about 100,000:1,200,000:1,300,000:1,400,000:1,500,000:1,600,000:1,700,000:1, 800,000:1,900,000:1 or even a ratio of at least about 1,000,000:1. However, in other embodiments, other ratios greater than 1:1 are acceptable, for example, 1.5:1, 2:1, 3:1, 4:1, 5:1, 6:1, 7:1, 8:1, 9:1, 10:1; 50:1, 100:1, 500:1, 1,000:1, or 5,000:1 or more.

The term "ion exchange membrane" as used herein is a broad term, and is to be given its ordinary and customary meaning to a person of ordinary skill in the art (and is not to be limited to a special or customized meaning), and refers without limitation to a membrane comprising chemical groups capable of combining with ions or exchanging ions between the membrane and an external substance. Such chemical groups include, but are not limited to, sulfonic acid, carboxylic acid, phosphoric acid, phosphoric acid, arsenic groups, selenic groups, phenols, and salts thereof. The chemical groups can be in a salt form or an acid form where the cations or protons are exchangeable with other cations from an external source, e.g., a solution or gas. Ion exchange membranes can be provided in acid form and converted to salt forms by pretreating the membrane with a base, such as an alkali metal base, e.g., sodium hydroxide, potassium hydroxide, sodium carbonate, sodium hydrogen carbonate, potassium carbonate or potassium hydrogen carbonate lithium hydroxide, or an alkaline earth metal bases, e.g., calcium hydroxide, calcium oxide, magnesium hydroxide or magnesium carbonate.

In one embodiment, the ion exchange membrane is a resin, such as a polymer containing exchangeable ions. Preferably, the ion exchange membrane is a fluorine-containing polymer, e.g., polyvinylidenefluoride, polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluoride-propylene rubber, and fluorinated thermoplastic elastomers. Alternatively, the resin comprises a composite or a mixture of polymers, or a mixture of polymers and other components, to provide a contiguous membrane material. In certain embodiments, the membrane material can comprise two or more layers. The different layers can have the same or different properties, e.g., chemical composition, porosity, permeability, thickness, and the like. In certain embodiments, it can also be desirable to employ a layer, e.g., a membrane that provides support to the filtration membrane, or possesses some other desirable property.

The ion exchange membrane is preferably a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the trade names NAFION® (E.I. du Pont de Nemours & Company), FLEMION® (Asahi Glass Company, Ltd), and ACIPLEX® (Asahi Chemical Industry Company).

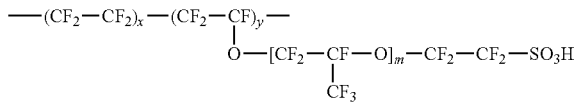

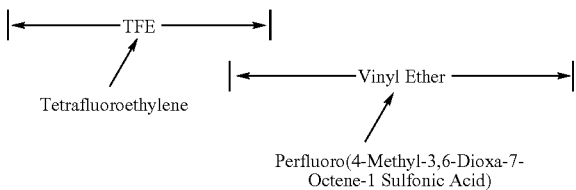

PFSA-TFE Copolymer in the Hydrolyzed Sulfonic Acid Form

A PFSA-TFE copolymer contains a tetrafluoroethylene (TFE) "backbone," to which perfluorosulfonic acid (perfluoro(4-methyl-3,6-dioxa-7-octene-1-sulfonic acid)) groups are attached. There can be one, two, three, four, five, or six perfluorosulfonic acid groups for every six TFE backbone units. Any suitable molecular weight polymer can be employed; however, polymers of this class are normally classified by Equivalent Weight (EW). Equivalent Weight is defined as grams of polymer material per mole of functional group. Preferably, an equivalent weight from about 500 EW or less to about 2000 EW or more is employed. The equivalent weight can also be from about 600, 700, 800, or 900 EW to about 1000, 1100, 1200, 1300, 1400, 1500, 1600, 1700, 1800, or 1900 EW. The equivalent weight can even be from about 910, 920, 930, 940, 950, 960, 970, 980, or 990 EW to about 1000, 1010, 1020, 1030, 1040, 1050, 1060, 1070, 1080 or 1090 EW. A single copolymer can be employed, or combinations of two or more different copolymers (e.g., varying in chemical composition, molecular weight, or other property) can be employed. A copolymer having a single peak molecular weight is generally preferred; however, in certain embodiments it can be preferred to employ a polymer with a bimodal or multimodal molecular weight distribution, with varying amounts of polymer chains having different molecular weights. The copolymers can be in any configuration, e.g., block, tapered, random, linear, branched, and/or cross linked.

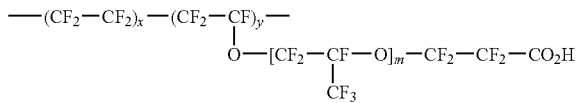

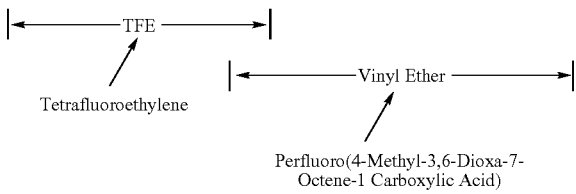

Chemical Structure of a PFCA-TFE Copolymer in the Hydrolyzed Carboxylic Acid Form PFCA-TFE copolymers contain a tetrafluoroethylene (TFE) "backbone," to which the perfluorocarboxylic acid (perfluoro(4-methyl-3,6-dioxa-7-octene-1-carboxylic acid)) groups are attached. PFSA-TFE copolymers and PFCA-TFE copolymers can be converted to the salt form by pretreatment with a suitable base, such as an alkali metal base (e.g., as described above). Such pretreatment processes of ion exchange membranes are well known in the art and can be performed, for example, in accordance with the manufacturer's recommendations. Depending upon the nature of the steam feed (e.g., impurities, impurity levels) and the resulting purified steam desired, the pretreatment conditions can be adjusted to yield an optimized membrane. For example, the selection of base, solvents used, temperature, exposure time, rinse conditions, extent of ion exchange (e.g., 10% or less to 90% or more) can be adjusted. It can also be desirable to adjust the hydrophilicity of the resulting membrane by cross linking it with a hydrophilic agent, or co-casting the polymer with a hydrophilic component. In such embodiments, the polymer already includes crosslinkable groups, or is functionalized to include crosslinkable groups. Other forms of pretreatment can also be employed (e.g., reaction with agents to modify the surface morphology of the polymer (roughen, increase or decrease porosity, etc.), without modifying the surface chemistry.

In another embodiment the polymer can be impregnated with inorganic oxides. These oxides can improve thermal stability of the resulting membrane by 5-50° C. In addition, theses inorganic oxides can increase water transport rate properties by 2-40%. Common inorganic oxides include, for example, zirconium oxide, titanium oxide, silicon dioxide, aluminum oxide, and manganese oxides.

Preferably, the membrane is a substantially gas-impermeable perfluorinated ionomer. FIG. 1 is a chart (ref. E.I. du Pont de Nemours & Company) showing the relative permeability of NAFION® membranes for selected gas molecules. The chart indicates the relative permeability of water vapor to other gases, such as $CO_2$ and CO. The chart also shows that the permeability of water vapor is greater than three orders of magnitude larger than the permeability of $CO_2$ or CO, and approximately six orders of magnitude greater than the permeability of oxygen or nitrogen.

As the chart depicted in FIG. 1 shows, hydrogen diffusion can be effectively suppressed through a NAFION® membrane, while permitting passage of water vapor. The substantially gas-impermeable membrane is preferably substantially nonporous. The substantially gas impermeable membranes can suppress the diffusion of gases and other materials, such as particles, aerosols, viruses, bacteria, prions, metals, ions, and other airborne molecular contaminants.

Preferably the perfluorinated ionomer membrane thickness is from about 0.5 microns to about 2000 microns. Leak rates can be measured by monitoring pressure in an isolated static system over extended time periods. Measurements conducted on membranes of the preferred embodiments found leak rates in the range of $10^{-9}$ $cm^3/cm^2/s$ for nitrogen.

In preparing ultrapure steam, a steam feed is passed through the membrane. The term "passing a steam feed through a membrane" as used herein is a broad term, and is to be given its ordinary and customary meaning to a person of ordinary skill in the art (and is not to be limited to a special or customized meaning), and refers without limitation to contacting a first side of a membrane with the steam feed, such that water molecules pass through the membrane, and obtaining a purified steam on the opposite side of the membrane. The first and second sides can have the form of substantially flat, opposing planar areas, where the membrane is a sheet. Membranes can also be provided in tubular or cylindrical form where one surface forms the inner portion of the tube and an opposing surface lies on the inner surface. One of ordinary skill in the art can readily appreciate that the membrane can take any form, so long as a first surface and an opposing second surface sandwich a bulk of membrane material. Depending upon the processing conditions, nature of the feed stream, volume of steam to be generated, and other factors, the properties of the membrane can be adjusted. Properties include, but are not limited to physical form (e.g., thickness, surface area, shape, length and width for sheet form, diameter if in fiber form), configuration (flat sheet(s), spiral or rolled sheet(s), folded or crimped sheet(s), fiber array(s)) fabrication method (e.g., extrusion, casting from solution), presence or absence of a support layer, presence or absence of active layer (e.g., a porous prefilter to adsorb particles of a particular size, a reactive prefilter to remove impurities via chemical reaction or bonding) and the like. It is generally preferred that the membrane be from about 0.5 microns in thickness or less to 2000 microns in thickness or more, preferably about 1, 5, 10, 25, 50, 100, 200, 300, 400, or 500 microns to about 600, 700, 800, 900, 1000, 1100, 1200, 1300, 1400, 1500, 1600, 1700, 1800 or 1900 microns. When thinner membranes are employed, it can be desirable to provide mechanical support to the membrane (e.g., by employing a supporting membrane, a screen or mesh, or other supporting structure), whereas thicker membranes can be employed without a support. The surface area of the membrane can be selected based on the volume of purified steam to be produced. Generally, to provide 10.0 g/min or 12.4 liters/min of steam into an environment having a pressure of 760 Torr and a boiler temperature of 108° C., it is desirable to employ a membrane of the preferred embodiments having at least 280 $cm^2$ of surface area. However, depending upon the chemistry of the membrane, higher or lower surface areas can be desirable. The pressure differential between the boiler feed side of the membrane and the permeate side, under the conditions cited above, is most preferably maintained at least 240 Torr. Higher pressure differentials can yield higher purified steam flow rates. For example, a pressure differential maintained at 440 Torr can yield a flow rate of 30 liters/min of purified steam when a membrane surface area of 280 $cm^2$ is used. Control of pressure can advantageously be utilized to regulate purified steam delivery rates.

Figure 2:
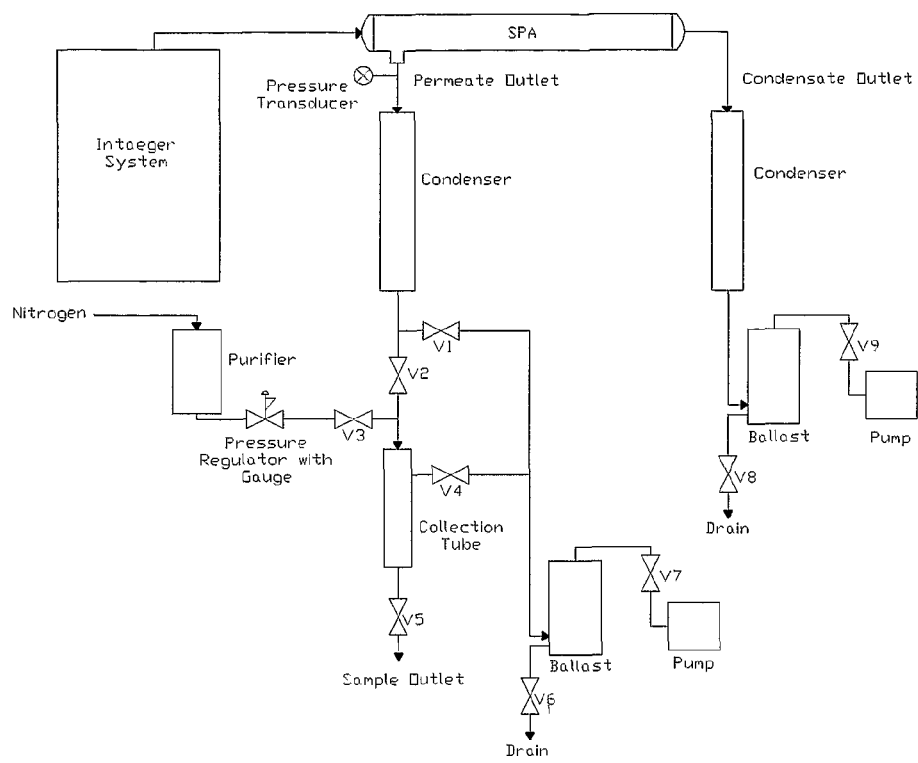
FIG. 2 is a schematic of the sub atmospheric steam delivery rate test apparatus.
Figure 3:
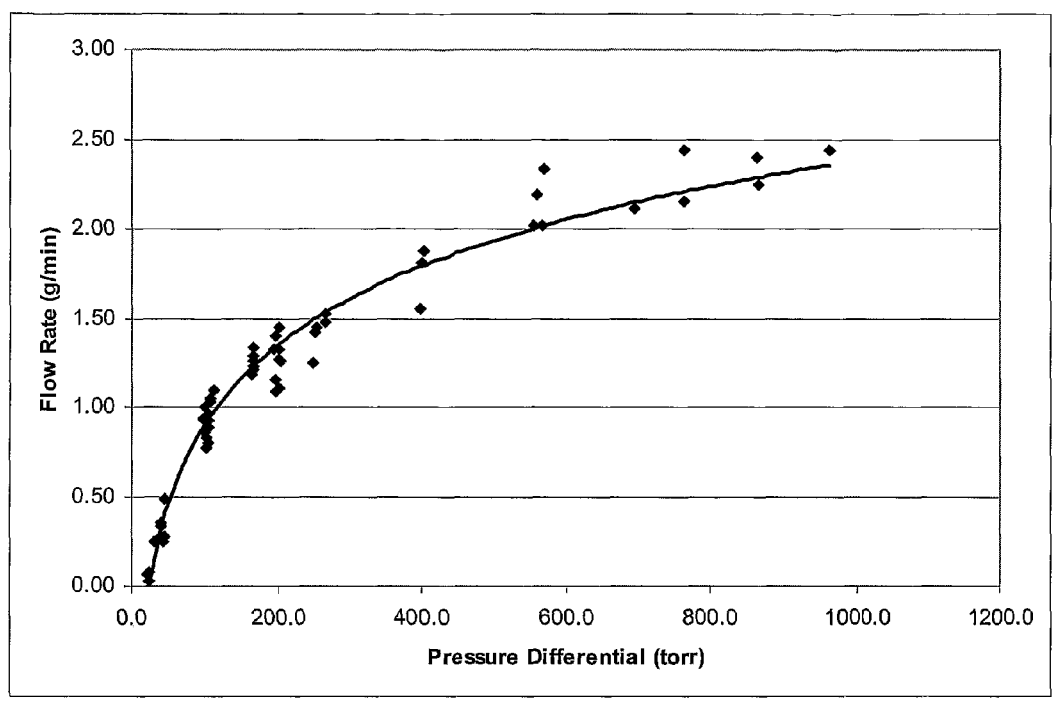
FIG. 3 is a graph which shows the relationship between flow rate and differential pressure under sub atmospheric conditions.

In another embodiment, purified steam can be delivered at sub-atmospheric pressures. This is highly desirable in several applications, including atomic layer deposition (ALD). Sub-atmospheric pressures can be achieved by providing downstream vacuum pumps, for example, a primary pump on the permeate side, and a secondary pump on the boiler side (FIG. 2). Pressure conditions can be managed by adjusting the boiler temperature and/or downstream steam venting. Differential pressure conditions allow for precise control of purified steam delivery rates under sub-atmospheric pressures. Purified steam can be delivered at pressures of from 10 to 760 Torr with the boiler pressure maintained at or below atmospheric pressure. One characteristic of the methods of preferred embodiments is that the relationship between pressure differential and purified steam delivery rate remains dependent on the individual boiler and permeate side pressures under sub-atmospheric conditions up to an asymptotic maximum value, at which point raising the boiler pressure or temperature no longer increases the permeation rate (FIG. 3). In addition, sub-atmospheric pressures allow for operation at reduced temperatures. Under these conditions, temperatures which approach 110° C. or less can be utilized.

Membranes in fiber form are generally preferred over sheet form, due to the ability to provide greater exposed membrane surface area in a fixed volume when fibers are employed. Preferably, the membranes comprise hollow fibers, the fibers being fixed at each end in a header. The fibers are normally sealed at the lower end and open at their upper end to allow removal of purified steam; however, in some arrangements, the fibers can be open at both ends to allow removal of purified steam from one or both ends. Alternatively, steam feed can be provided to the interior of the membrane fibers, and purified steam removed from a space surrounding the exterior of the fibers.

The Filtration Apparatus

The membranes are preferably fixed in a module or other suitable filtration apparatus. If the membranes are in fiber form, they are preferably arranged in cylindrical arrays or bundles; however other configurations can also be employed, e.g., square, hexagonal, triangular, irregular, and the like. The membrane module preferably includes a plurality of hollow membrane fibers extending longitudinally between and mounted at each end to a respective header; however other configurations are also contemplated, e.g., looped fibers wherein both ends are secured in a single header. The fibers can be taut or slack, and can be in a closely packed formation, or spaced apart. Typically, the fibers within the module have a packing density (as defined above) of from about 5% or less to about 95% or more, preferably from about 6, 7, 8, 9, or 10% to about 60, 65, 70, 80, or 90%, and more preferably from about 11, 12, 13, 14, 15, 16, 17, 18, 19, or 20% to about 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55%.

The fibers can be partitioned into a number of bundles so as to form a space or spaces there between, or a single bundle can be employed. Generally, it is preferred to maintain some degree of spacing between the fibers, so as to facilitate the circulation of steam feed. The fiber bundle can be protected by a module support screen. Alternatively, a casing can contain the fibers and provide support to the header or headers. Support elements appropriately spaced can provide unrestricted gas flow to the fibers. Alternatively, clips or rings can also be employed to bind the fiber bundle. The materials employed in the header and any supports or casing are selected so as to be able to tolerate the elevated temperature and pressure conditions, and resist reacting with or contaminating the steam feed or purified steam. One or more membrane modules can be arranged into a cassette or battery, with each cassette or battery being provided with a source of steam, pumps, valves, and instrumentation.

In a preferred embodiment, a system for purifying steam is provided comprising a source of steam feed; a passageway through which the steam feed is transferred to a first side of the substantially gas-impermeable membrane (the membrane in a suitable module or other filtration apparatus); and a second passageway by which purified steam from the opposite surface of the substantially gas-impermeable membrane is removed. The source of the steam feed can include, but is not limited to, a boiler, a reactor, a pressurized holding tank, or a stream from a steam-generating industrial process. The first and second passageways preferably comprise a pipe or other conduit, preferably fabricated from a material that is nonreactive or minimally reactive to steam (in the case of the first passageway) or ultrapure water (in the case of the second passageway), that does not add appreciable impurities to the steam passing there through, and that can tolerate elevated temperatures characteristic of steam. Preferred materials for use in fabricating the passageways include corrosion resistant alloys, non-reactive polymeric materials, glass or quartz lined tubes, and the like. The membrane is preferably in the configuration of a module, as discussed above. The purified steam can be routed directly to the process or device that will utilize it, or else it can be routed to a storage tank, as discussed above.

Preferably a vessel is provided wherein water is heated to a temperature sufficient to create the steam. Suitable temperatures include those from about 20° C. or less to about 300° C. or more, or about 40° C. to about 220° C., such as about 50° C., 60° C., 70° C., 80° C., 90° C., 100° C., 110° C., 120° C., 130° C., 140° C., 150° C., 160° C., 170° C., 180° C., 190° C., 200° C., or 210° C. Suitable temperatures also include those from about 80° C. to about 200° C., about 100° C. to about 180° C., about 100° C. to about 170° C., about 100° C. to about 160° C., or about 100° C. to about 250° C. Suitable temperatures even include about 105° C., 110° C., 115° C., 120° C., 125° C., 130° C., 135° C., 140° C., 145° C., 150° C., and 155° C. Suitable temperatures can be selected based on the pressure in the vessel.

Suitable temperatures for the steam include temperatures of about 80° C. or less to about 200° C. or more, such as about 90° C., 100° C., 110° C., 120° C., 130° C., 140° C., 150° C., 160° C., 170° C., 180° C., 190° C., or 200° C., at a pressure of greater than 1 atm, preferably from about 1.5, 2, 2.5, 3, 3.5, 4, 4.5, 5, 5.5, 6, 6.5, 7, 7.5, 8, 8.5, 9, or 9.5 atm up to about 10 atm or greater.

For sub-atmospheric purified steam delivery, the consistency of the relationship between pressure differential and purified steam delivery rates is highly advantageous. In this embodiment, suitable temperatures for the steam are from about 10° C. or less to about 130° C. or more, such as about 20° C., 30° C., 40° C., 50° C., 60° C., 70° C., 80° C., 90° C., 100° C., 110° C., 120° C., or 130° C. Suitable pressures for the boiler side range from 10-1400 Torr, while suitable pressures for the permeate side range from 0.001-760 Torr.

From a configuration standpoint, a dual bed system can be employed to insure a continuous supply of water to the steam generator. Such a system can be employed with a switch valve, such that in operation one unit is online while the other is off, and vice versa. Alternatively, a bank of two or more filtration units can be employed in parallel, with appropriate valves and piping such that an individual unit can be taken offline (e.g., for maintenance, or during times of reduced steam need), put online (e.g., during times of increased steam need), or independently operated at an increased or reduced steam output rate. It is also desirable to employ a deionized water automatic refill system into the system, to ensure a constant supply of water to the steam generator. The deionized water system can employ multiple filter beds, and can have the ability to automatically switch or replace beds upon experiencing a pressure drop or a drop in permeate generation rate. The filter beds can be removed or switched mechanically, either automatically or manually. If a pressure drop in the filter bed is due to ionic fouling, an acid vapor can be employed to regenerate the surface of the adsorbate. For other forms of fouling, high pressure water can be used to remove foulants.

The Steam Generation Apparatus

Figure 4:
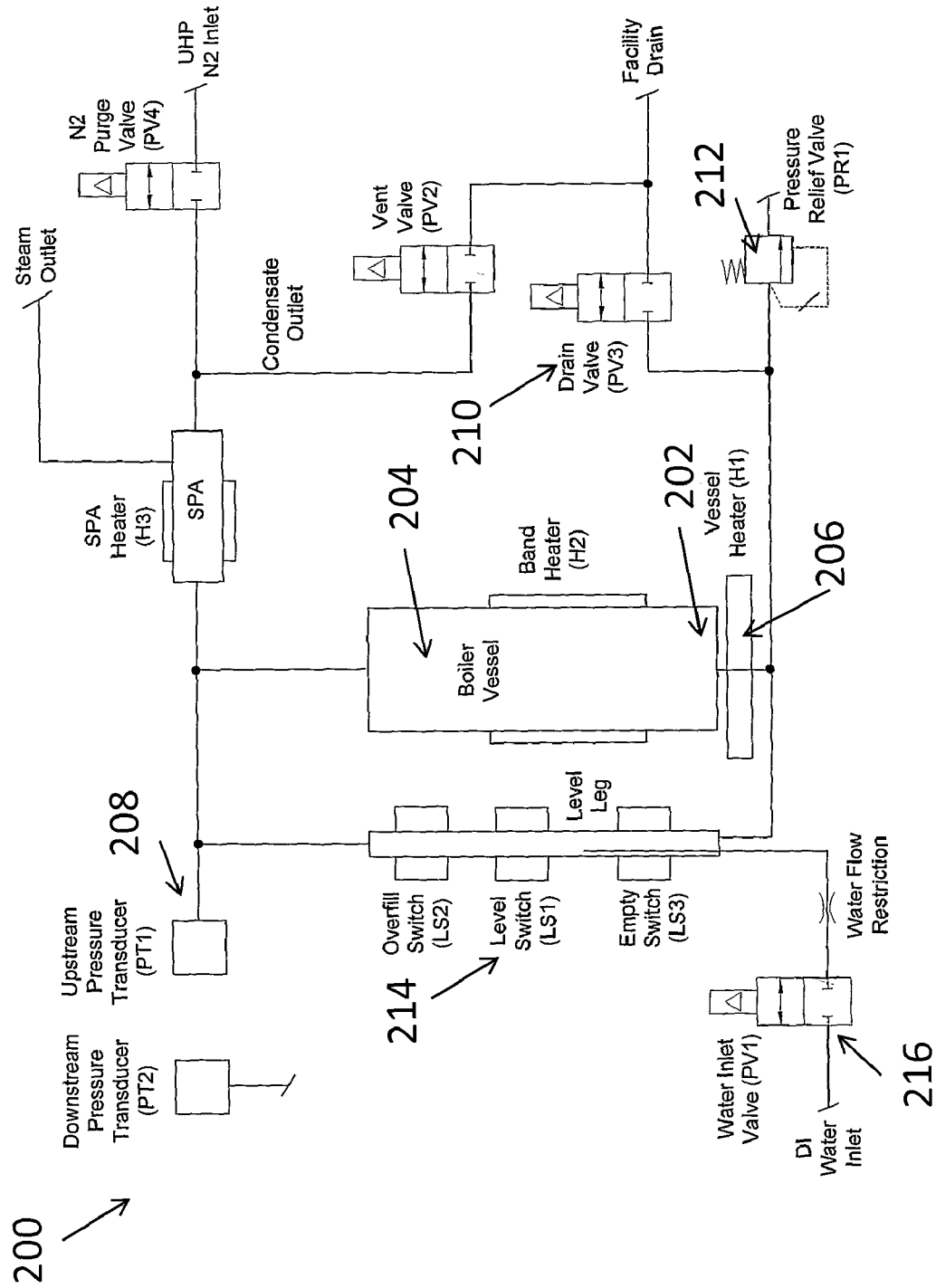
FIG. 4 is a schematic of steam delivery configuration 1.
Figure 5:
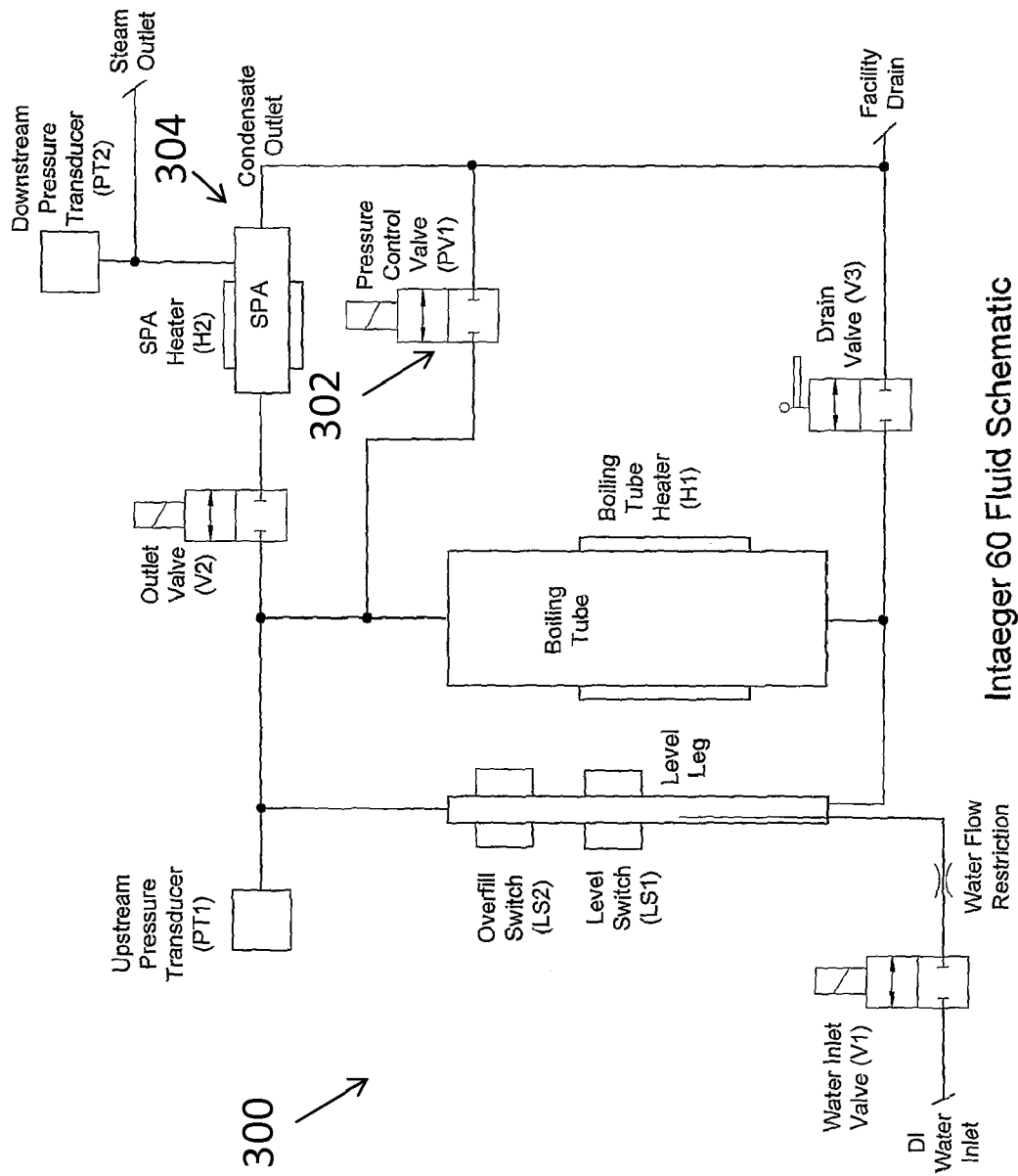
FIG. 5 is a schematic of steam delivery configuration 2.

FIG. 4 and FIG. 5 show a steam generator apparatus 200 to deliver steam. This generator can contain a water reservoir 202 to store water, a boiler assembly 204 with a heat source 206 to generate the supply steam, a pressure transducer 208 to monitor the steam pressure in the boiler, a drain valve 210 to empty the water from the system, a pressure relief valve 212 to prevent over pressure condition in the boiler, and a water level control switch 214 to maintain the correct water level in the boiler. The system can be controlled manually, but the preferred method is to employ an automatic control system that controls the water level with an automated fill valve 216 and controls the pressure by turning off and on the heat source 206. Additionally, the entire system can be heated to prevent condensation of steam and purified steam. The steam generator 200 can be made from a corrosion resistant material, for example, stainless steel, quartz, sapphire, or perfluoroalkoxy polymer resin (PFA). The source of heat 206 can be an infrared heater or resistance heater commonly used today.

The level control can use a mechanical float switch, or optical switches 214 (either contacting the water or non-contacting). Due to the condensing nature of steam, a non-contact sensor mounted externally (e.g., as is available from OMRON) is preferred. To limit noise, a parallel leg can be run to dampen the effects of boiling on the true water level 218.

Pressure can be measured with a gauge or preferably with a pressure transducer 208, e.g., as manufactured by many suppliers including MKS (Massachusetts), Honeywell or MSI.

Monitoring of pressure, external user requirements, and control of valves and heaters is preferably accomplished by an electronic control device using either a programmable logic controller made by OMRON, Allen-Bradley (Milwaukee, Wis.), or other suitable systems by other suppliers. Alternatively, a custom designed system based on a microprocessor can be used, as can a personal computer such as a PC104 based system.

FIG. 5 shows an alternative configuration of a steam generator 300 with a proportioning control 302 valve to vent the head space. Alternatively, the outlet of the purifier 304 can be used to control pressure within the boiler. This vent valve is open to atmosphere when operating in an atmospheric mode and connected to vacuum with a restriction when operating in a sub-atmospheric mode.

While it is generally preferred to generate steam in a boiler, the source of steam feed can also include waste steam from any commercial or industry process. In another embodiment, the steam can be generated from any external process such as from heat generated by an industrial process, such as cooling, a chemical reaction or washing, and the like.

In certain embodiments it is desired for the purified steam to be collected and stored for later use, or for the purified steam to be redirected to a device of system that will use the steam for a particular application. Alternatively, the steam can be converted to purified water, either for storage or immediate use, or can be reheated to generate purified steam. It is desirable to provide a tank suitable for storing the steam, e.g., a pressurized tank with temperature control to maintain the steam in a state ready for use. Alternatively, the system can be provided with a condenser or heat exchanger and a liquid water storage tank for storing condensed steam, or a heating system to regenerate the steam.

Maintaining Filtration Efficiency

In some embodiments, drying out of the membrane occurs under high temperatures (80° C. and greater) in the regions in contact with the impurity gases, which may hamper water vapor flow through the membrane. For example, in the case of PFSA-TFE copolymer membranes, permeation through the membrane may be dependent on the water content of the membrane. If a portion of the membrane is blocked by dry gases, e.g., impurity gases containing little or no water, the water content of the membrane may be reduced, thereby reducing the water permeation rate in turn. To minimize drying of the membrane or blockage of the membrane by impurities, it can be desirable to provide a purge flow to the membrane. The purge flow flushes built up impurities, and can maintain moisture levels in the membrane. The amount of purge flow to the membrane can be adjusted, depending on the type and level of volatile (or non-condensing) impurities in the steam feed, as well as the ratio of the volume of feed steam the membrane is exposed to the volume of purified steam produced. Preferably, the purge flow rate is from about 1% or less to about 50% or more of the input flow rate, preferably from about 5, 10, 15, or 20% to about 25, 30, 35, 40, or 45%. The purge flow rate can also be adjusted based on the system geometry. In certain embodiments wherein the membrane module has a high membrane surface area, a small volume of steam feed, and larger purge flow rates, a higher purge flow may be necessary to prevent any buildup of impurities, such as gas impurities, within volume. Continuous, intermittent, or cyclic purging can be conducted. It is particularly preferred to conduct cyclic purging, wherein the purge on and purge off times are of equal length, and the total cycle time (time of one purge on and one purge off period), is from about 1 second or less to about 1 hour or more, preferably from about 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 105, 110, 115, or 120 seconds to about 130, 140, 150, 160, 170, 180, 190, 200, 210, 220, 230, 240, 250, 260, 270, 280, 290, or 300 seconds, or about 6, 7, 8, 9, 10, 15, 20, 25, 30, 35, 40, 45, 50, 55, or 60 minutes or more. Regular or irregular cycles (in which the purge on and purge off times vary) can be employed, as can sinusoidal, triangular, or other types of cycles, wherein the purge rate is not varied in a discontinuous fashion, but rather in a gradual fashion, at a preferred rate or varying rate. Different cycle parameters can be combined and varied, as suitable. In certain embodiments, the flow rate of steam through the membrane is monitored, and when the rate drops below a preselected value, a purge cycle is initiated. Alternatively, a preselected purge cycle is implemented. Advantages of discontinuous purge over a continuous purge include energy savings and greater efficiency. Any suitable purge gas can be employed, however it is generally preferred to employ a portion of the steam feed. Alternatively, if excess purified steam is produced, this excess steam can be recycled to the steam feed side of the membrane.

Gases other than water can restrict the flow of water vapor across the membrane, regardless of whether the environment is fully saturated. Such gases include, but are not limited to, the gases discussed above, particulates, and other materials. To maintain an acceptable rate of diffusion of water vapor across the membrane, the surface of the membrane can be continuously or frequently purged as described above to prevent the build up of non-water vapor gases at the membrane/gas boundary layer. The higher the operating temperature, driving pressure, or concentration of gaseous impurities, the more frequently and/or higher the purge rate employed to maintain boundary layer cleanliness. The higher the rate of flow across the membrane, the more likely it is that dissolved gases will accumulate at the boundary layer of the membrane.

At initial startup conditions, the head space preferably undergoes either purging or evacuation to insure that gaseous contaminants are removed or reduced so as to not prevent or inhibit startup of filtration of water vapor across the membrane. If the membrane is heated and a lower pressure is applied filtrate side of the membrane, a net drying of the membrane can occur and membrane failure can result. Once flow has commenced, membrane purging is preferably continuously or intermittently conducted as discussed above, depending on the process conditions. Under certain conditions, it can be desirable to precondition the membranes, e.g., by soaking in ultrahigh purity water, or otherwise exposing the membranes to water or water vapor, preferably at elevated pressure and/or temperature to assure full saturation.

For optimal rates of production of ultrahigh purity steam, it is preferred that the membrane system be operated in a saturated water vapor environment and that the boundary layer of the membrane is purged so as to remove contaminants that can block or reduce water vapor diffusion through the membrane.

Certain membranes employed in the methods and systems of the preferred embodiments are permeable to hydroxyl-containing compounds, e.g., methanol, ethanol, i-propanol, n-propanol, and higher alcohols, and other polar compounds such as aldehydes or organic acids. A prefilter can be employed to eliminate or reduce hydroxyl-containing and other contaminants. Suitable prefilters include, for example, activated carbon, silica gel, activated alumina, basic alumina, basic carbon, ion exchange materials, zeolites, porous clay minerals, and molecular sieves. Such Prefilters can also be used to remove high levels of biological, ionic, or inorganic matter. High levels of ionic contaminants are typically found in tap water. Such contaminants can rapidly deplete an ionic resin filter bed, and can rapidly clog the filters of preferred embodiments. Accordingly, an ionic or regenerable filter bed can be employed to reduce contaminants. Other methods to reduce the amount of contaminants in the feed steam or source of feed steam can also be employed, e.g., ozonation to reduce contaminants, "HEPA-type" filters, ionizing charged-media type filters, chemisorption, and the like. Suitable contaminant reduction methods and apparatus can be selected based on the form of the water to be treated (e.g., liquid or vapor).

The membrane can also be regenerated by flowing an acid vapor over the surface, such as HCl or HF. In certain embodiments, it can be desirable to employ other acids, e.g., HBR, organic acids, acids in liquid form, and the like. The acid can be concentrated, or in a diluted form. Preferably, a solution of from about 1, 2, 3, 4, or 5% by weight or less acid to about 95% by weight or more acid can be employed, more preferably from about 10, 15, or 20% by weight to about 25, 30, 35, 40, 45, 50, 55, 60, 65, 70, 75, 80, 85, or 90% by weight. Alternatively, an alcohol wash can be employed. Exposure to alcohols can cause the membranes of preferred embodiments to swell. The membranes of the preferred embodiments can be cleaned by flushing through with an hot isopropyl alcohol (IPA) vapor and then flushed with steam. After the acid or alcohol treatment has been conducted, it is desirable to rinse the membrane in liquid ultrapure water, or to expose the membrane to ultrapure steam, so as to remove any residual acid.

In certain embodiments, a method for detection of leaks in the membrane is provided. Preferably a pressure test is conducted, wherein pressure transducers upstream and downstream of the membrane are monitored for abrupt pressure increases downstream of the membrane indicative of a leak. If a leak is identified, the filtration assembly can be taken offline and either replaced or repaired.

Methods of Operation

Figure 6:
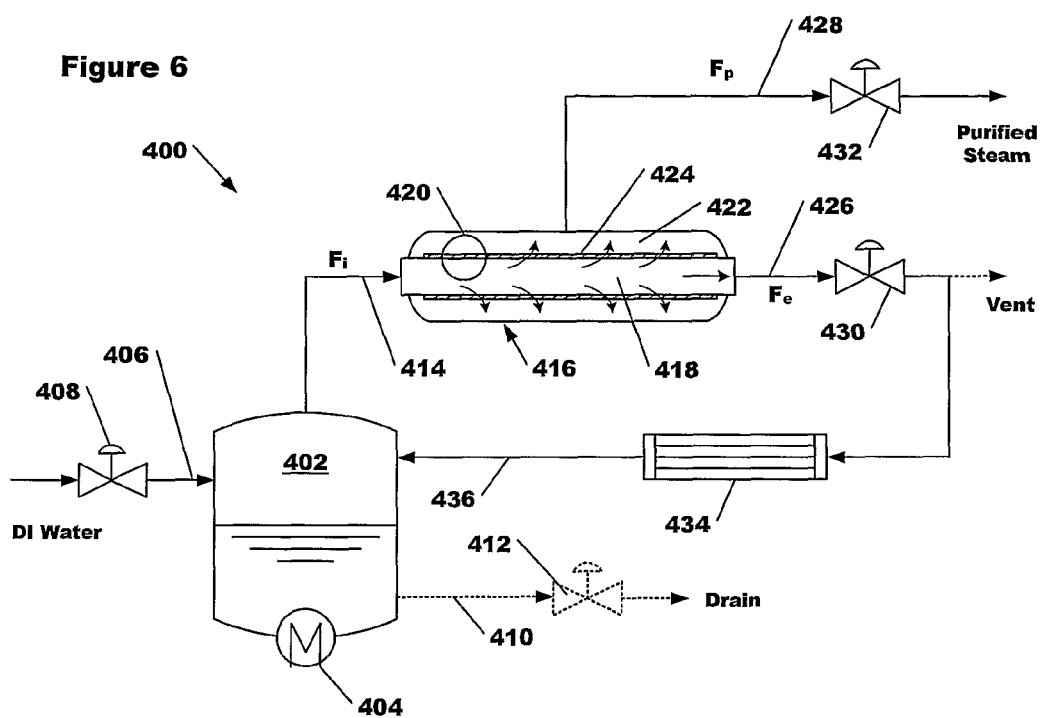
FIG. 6 is a schematic view of a first embodiment of a system for purifying steam.

FIG. 6 is a schematic view of one embodiment of a system for purifying steam. System 400 comprises heater 404 for creating a source of a steam feed and a purification device 416 for housing a substantially gas-impermeable membrane 424. In the operation of system 400, water, such as deionized water, is added to vessel 402 to provide a source of the steam feed. Water can be introduced into vessel 402 via valve 408, which can control the flow of input water through input piping 406. Optionally, a drain piping 410 can be coupled to vessel 402 for the purpose of draining a small portion of the fluid contained within vessel 402 to prevent the buildup of non-volatile impurities over time. Valve 412 can be associated with drain piping 410 to control the amount of fluid discarded through drain piping 410.

The steam feed produced in boiling vessel 402 travels through, for example, piping 414 to purification device 416 at a total flow $F_i$. Membrane 424 is shown as a partial cross section schematic view of, for example a tube. However, it will be appreciated by those of ordinary skill in the art that membrane 424 can be present as a flat sheet. Alternatively, membrane 424 can be presented as an array of tubes, e.g., a bank of parallel tubes coupled between two headers, or an array of planar sheets, e.g., a bank of planar sheets held in gas tight frames as in a filter press. An array can effectively provide a large membrane surface area for very high purity or large scale application.

FIG. 6 depicts the steam feed entering purification device 416 via volume 418, where a portion of the total input flow $F_i$ passes through membrane 424 into volume 422 to form a purified steam. The purified steam can exit volume 422 of device 416, e.g., via piping 428, as purified flow $F_p$. Impurities in the steam feed entering device 416 are rejected by membrane 424 to an extent in accordance with the component specific membrane separation factor, as shown, for example, in FIG. 7. Purified steam flowing through piping 428 can exit the system at a flow controlled by control valve 432 to the point of use.

System 400 also provides piping 426 that carries portion $F_e$ (also termed "purge flow") of input flow $F_i$ out of volume 418. Purge flow $F_e$ contacts the surface of membrane 424 exposed to volume 418 and does not pass through the membrane. Any water vapor that does pass through the membrane forms the purified steam and thus, the quantity of steam in purge flow $F_e$ is less than the quantity of steam in input flow $F_i$.

Flow $F_e$ can be useful to aid vapor permeation across the entire area of the membrane. Flow $F_e$ can sweep away volatile impurities (e.g., nitrogen, oxygen, vaporous hydrocarbons, and other gases) that can accumulate along the face of membrane 424 that contacts input flow $F_i$ or even within the bulk of the membrane. The faster the diffusion rate, the quicker the build up of impurities at the surface of membrane. Because the accumulated impurities can block access to the membrane and slow the flow of water vapor through membrane 424, the use of flow $F_e$ can help maximize the surface area of membrane 424 available for flow of water vapor. Flow $F_e$ can be vented from system 400 at a rate controlled by, e.g., valve 430 associated with piping 426. Alternatively, instead of venting flow $F_e$ from system 400, it can be reused as a source of steam feed by being directed to condenser 434, which condenses water vapor from flow $F_e$ for reuse. Non-condensable impurities can be vented from condenser 434 (not shown), whereas the liquid water can be returned to the boiler 402 via piping 436.

In one embodiment, $F_e$ can be vented from system 400 continuously by opening valve 430 to expose a desired aperture diameter. In another embodiment, $F_e$ can be vented from system 400 intermittently, e.g., by opening and closing valve 430 at desired time intervals. Control valve 430 can be operated manually or by a control system (not shown), as described below.

Under some circumstances, reducing $F_e$ to a low or zero flow rate can halt or substantially reduce the flow of water vapor through membrane 424. Although some flow of water vapor may occur by diffusion, it can be slow compared to the normal permeation rate. Moreover, if $F_e$ is too low, there may be a risk of allowing contamination of the steam feed by back diffusion from volume 422 from the vent or non-condensable gases originating in the boiler. Accordingly, it is generally preferred to maintain $F_e$ at a suitable flow rate, although in certain embodiments a low or zero flow rate can be acceptable or even preferred.

It is generally preferred to maintain a preselected pressure differential across the membrane to facilitate steam flow. Referring to FIG. 6, purge flow $F_e$ is directed via piping 426 to control valve 430. Valve 430 can aid in controlling the pressure in vessel 402 and in volume 418 of purification device 416. Control valve 430 can be operated manually or by a control system (not shown) in accordance with methods well known to those skilled in the art. The control system can be used to monitor variables such as boiling vessel 402 pressure, pressure within volume 422, point of use pressure, and/or boiling temperature to maintain the pressure differential as well as by the addition or reduction in heat to the water. The control system can be associated with a computer operating software capable of calculating optimal pressures and flow rates to achieve a desired pressure differential across the membrane.

In other embodiments, the pressure differential can be maintained by controlling the pressure within vessel 402 with temperature and/or pressure through controlling heat flow or venting the steam upstream and/or the rate of steam feed flow $F_i$ and/or purge flow $F_e$.

Vessels and piping in system 400 can be constructed of materials resistant to the contamination of and corrosion by steam and water. For example, boiling vessel 402 can be made of electro-polished stainless steel, quartz, glass lined steel, or fluorocarbon polymer materials such as PVDF (polyvinylidine difluoride), KYNAR®, fluorinated ethylene propylene (FEP) TEFLON®, perfluoroalkoxy polymer resin (PFA) TEFLON®, tetrafluoroethylene (TFE) Teflon®, polyetheretherketone (PEEK), poly(ethylene chlorotrifluoroethylene) (ECTFE), poly(chlorotrifluoro ethylene) (PCTEF), and TEFZEL® modified ETFE ((ethylene-tetrafluoroethylene) fluoropolymer). The material choice can be determined by temperature, pressure, and maintenance schedule employed. Piping and valves can be made from the aforementioned polymeric materials, which can be useful in maintaining the purity of the product, or from other suitable materials, such as metals or alloys. Steam purification device 416 can be constructed of the aforementioned polymer materials, or preferably constructed of materials such that any wetted areas are exposed to inert or relatively unreactive materials. Piping 414, 428 and device 416 can be insulated and/or heat traced (not shown) to prevent condensation of the steam, or employed without insulation or heat tracing.

The system for purifying steam preferably operates at temperatures of from about 10° C. or less to about 300° C. or more, depending on whether it is sub-atmospheric or atmospheric, such as from about 10° C. to about 1300° C., or from about 100° C. to about 300° C. for atmospheric systems. In one embodiment, a temperature can be from about 110° C. to about 160° C., depending on factors such as membrane thickness and/or the use mechanical support. The temperature in certain embodiments can even be as high as from about 250° C. to about 300° C., depending on the factors described herein.

For example, for PFSA-TFE copolymer membranes, a temperature of from 100° C. to 300° C. can be used for filtration of saturated steam at a pressure of from 1.0 to 85 atmospheres absolute pressure. PFSA-TFE copolymer membrane thickness can be from 0.5 microns to 0.062 inches (1600 microns). In one embodiment where the membrane has a thickness in the micron and submicron ranges, the membrane is typically supported in such a manner as to be pin hole free, and to prevent tears and distortions that could leak. The preferred thickness of the membrane can be dependent on various factors, such as geometry (e.g., flat sheet versus hollow fiber), surface area, pressure drop, saturated steam temperature, thermal expansion rate, longevity, and desired pure steam production rate.

Another embodiment provides a method for the control and measurement of purified steam flow rates based on the diffusion characteristics of the membrane. As is well known to those of ordinary skill in the art, the accurate measurement and control of high purity steam can be very difficult. Conventional mass flow controllers, which rely on heat transfer to the moving gas, can be prone to large errors such as when the steam is near saturated conditions. In addition, thermal mass flow controllers are much less effective with low vapor pressure gases or at high temperatures Orifice and venturi measurement devices can also incur errors if any condensation occurs during pressure changes within the measurement device. These devices are also sensitive to pressure transducer accuracy and particle buildup at the small orifice.

Figure 8:
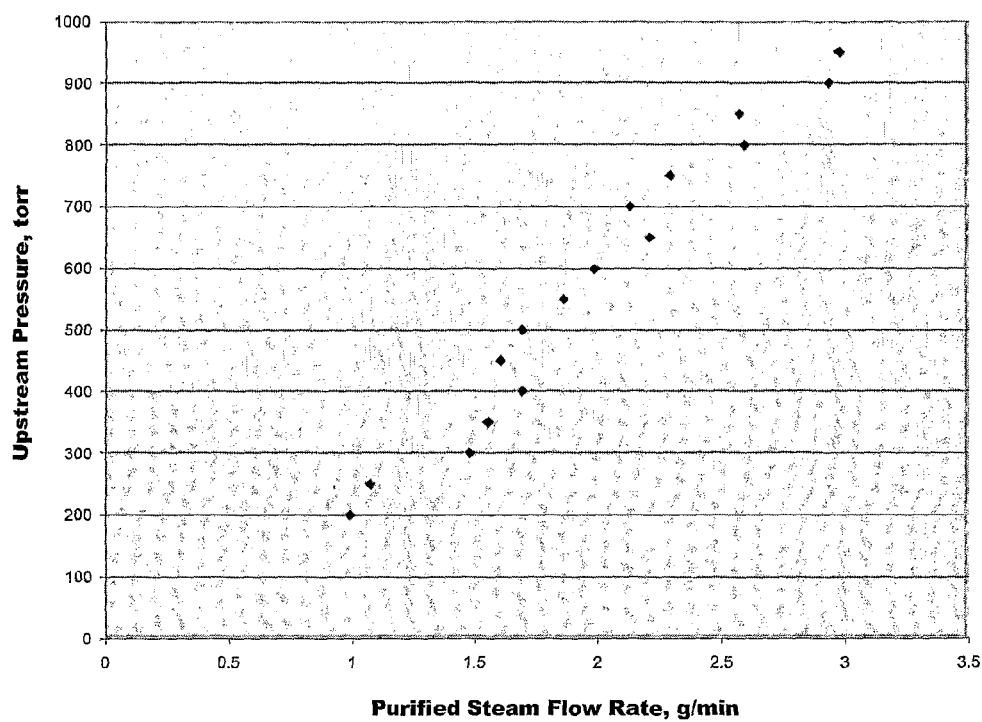
FIG. 8 is a chart of Upstream Pressure versus Purified Steam Flow Rate for the apparatus of FIG. 11.

In one embodiment, the transport rate of steam through the PFSA-TFE or PFCA-TFE copolymer membranes is measured as a function of pressure drop across the membrane. As discussed herein, the mass transport rate of steam through the membrane is approximately proportional to the pressure drop across the membrane. Calibration curves can be generated for a variety of transport properties, e.g. linear, logarithmic, and parabolic. The membrane begins the transfer rate with a linear relationship (FIG. 8). However, as the upstream pressure is increased, the relationship to flow becomes logarithmic with an eventual asymptotic value being reached. By altering the pressure on either side of the membrane by means of valves or other pressure constricting device, a high purity steam flow controller can be constructed. Those skilled in the art can design multiple flow designs that depend on the mass transfer rate of the membrane to generate a calibrated flow curve with differential pressure.

Figure 7:
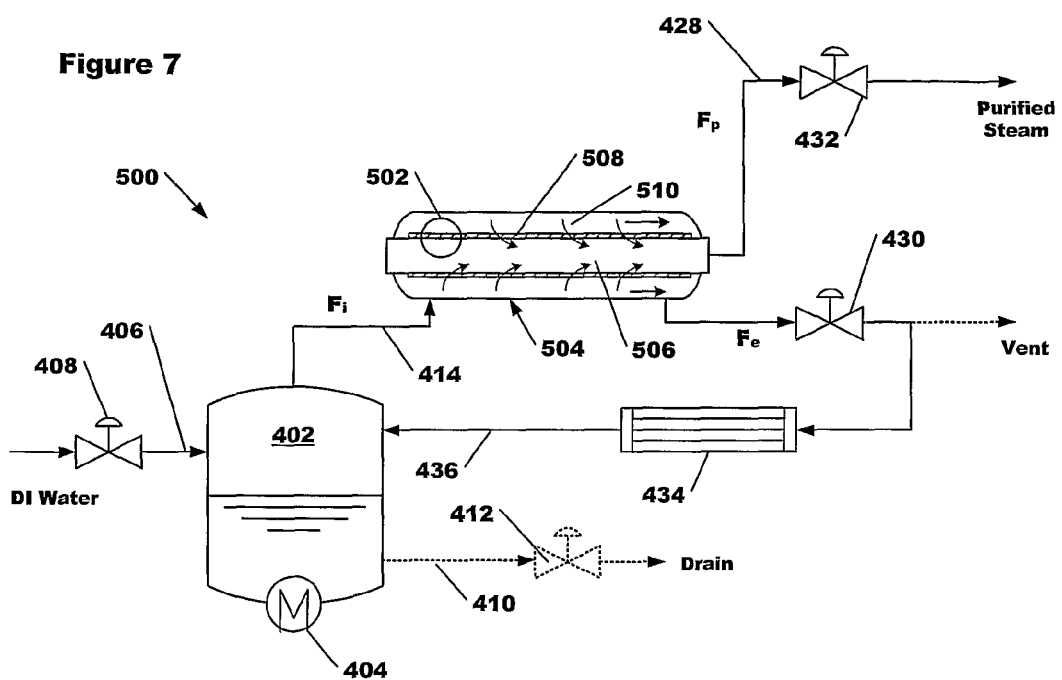
FIG. 7 is a schematic view of a second embodiment of a system for purifying steam.

FIG. 7 is a schematic view of system 500 for the purification of steam, in accordance with another embodiment. The operation and description of any or all elements outside of steam purification device 504 can be applied from the discussion of FIG. 6 above. System 500 comprises purification device 504 containing a substantially gas-impermeable membrane 508, such as a PFSA-TFE copolymer membrane. Membrane 508 divides the total internal volume of device 504 into two gas tight volumes 506 and 510. In this embodiment, a steam feed is contacted with the outer surface of membrane 508, whereas the previously illustrated embodiment of FIG. 6 shows contact of the steam feed with the inner surface of membrane 424. Again, it will be appreciated by those of ordinary skill in the art that the membrane can be present as an array of tubes, e.g., a bank of parallel tubes coupled between two headers, or an array of planar sheets, e.g., a bank of planar sheets held in gas tight frames as in a filter press, or any combination of the above, together, in series or in parallel. Impure steam from vessel 402 is introduced into volume 510, where a portion $F_e$ of the total flow $F_i$ passes through membrane 508 into volume 506, exiting device 504 via piping 428 in a purified state as flow $F_p$. Impurities entering device 504 with the steam are rejected by the membrane in accordance with the component specific membrane separation factor, as shown, for example, in FIG. 1. Purge flow $F_e$ exits volume 510 to control valve 430. The magnitude of the purge flow $F_e$ in FIG. 7 can differ from that of FIG. 6 because volume 418 may be significantly different from volume 510.

Preferably, a membrane purification process for obtaining high purity steam can have the capability of removing inert gases, such as oxygen and nitrogen, without performing at least one of the processes selected from excessive purging, de-gassing, and multiple condensation and re-boil cycles. In another embodiment, a membrane purification process is capable of preventing aerosol transport into the purified steam, while rejecting any unwanted organic or biological materials.

Figure 9:
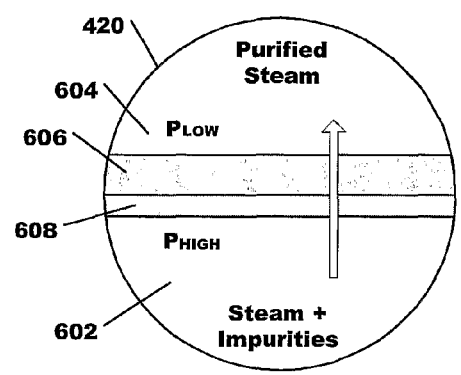
FIG. 9 is an expanded view of a detail of FIG. 6.

FIG. 9 depicts an expanded view of detail 420 of FIG. 6 or 502 of FIG. 7, according to certain embodiments. Membrane 608 separates region 602 comprising the impure steam mixture from region 604 comprising the purified steam. To facilitate water vapor flow across the membrane 608, the pressure of the steam feed in region 602 is higher than that of the purified steam in region 604. Specifically, the pressure of the steam feed in region 602 is greater than the pressure of purified steam in region 604. In one embodiment, the rate of moisture transport is typically related to the total pressure drop (pressure differential) across the membrane 608, owing to the fact that water is the majority component of the steam feed and purified steam.

A porous membrane support 606 can be positioned in contact with the surface of membrane 608 exposed to region 604, to add structural and/or mechanical integrity to the membrane. In one embodiment, the porosity of the support is such that it minimizes interference and operation of the membrane, and such porosities can be determined by one of ordinary skill in the art. A supported membrane can allow its use at higher temperatures, or at thinner dimensions. Support 606 can be made of porous polymers, ceramics, or metals. Exemplary materials for support 606 include, but are not limited to, TEFLON® TFE, porous quartz, or 316L Stainless Steel. Any other suitable material that can withstand the pressure and temperature and generate minimal pressure drop without contaminating the purified steam can also be used. Alternatively, membrane 608 can be thick enough or fabricated in a geometry that will resist deformation, such as small diameter tubing. Small diameter tubing can be placed in parallel arrays to provide sufficient surface area for adequate throughput of the purified steam, as is well known to those skilled in the art.

The porous membrane support 606 if utilized, preferably imposes minimal restriction on the flow of water vapor (or minimal interference with membrane operations) from region 602 to region 604. Its general purpose is to increase the structural integrity of the membrane, such as by prevent collapse of the membrane 608 under a pressure differential. Since higher moisture transport rates are found at higher temperatures where the structural rigidity of the membrane is the weakest, and at higher pressure differentials, a membrane support 606 can be useful. Additionally, transport through thinner membranes 608 occurs at a higher rate, where membrane rigidity is further compromised.

Levels of Purification

The devices and methods of the preferred embodiments have many potential applications with a variety of requirements. These include traditional industrial processes (e.g. raw chemical processing) which only require steam at several hundred ppm (parts per million) level purity, to pharmaceutical applications which require steam at low ppm or high ppb (parts per billion) purity. In the extreme case some semiconductor applications require steam at ppt (parts per trillion) level purity. In this lower extreme, metals removal is of primary concern. The methods and systems described above can be design to suit the entire range of requirements. However, the examples and data described below were primarily designed to suit the most stringent requirements. A representative summary of data is presented in FIG. 10.

EXAMPLE 1

Removal of Metals from Steam

Figure 11:
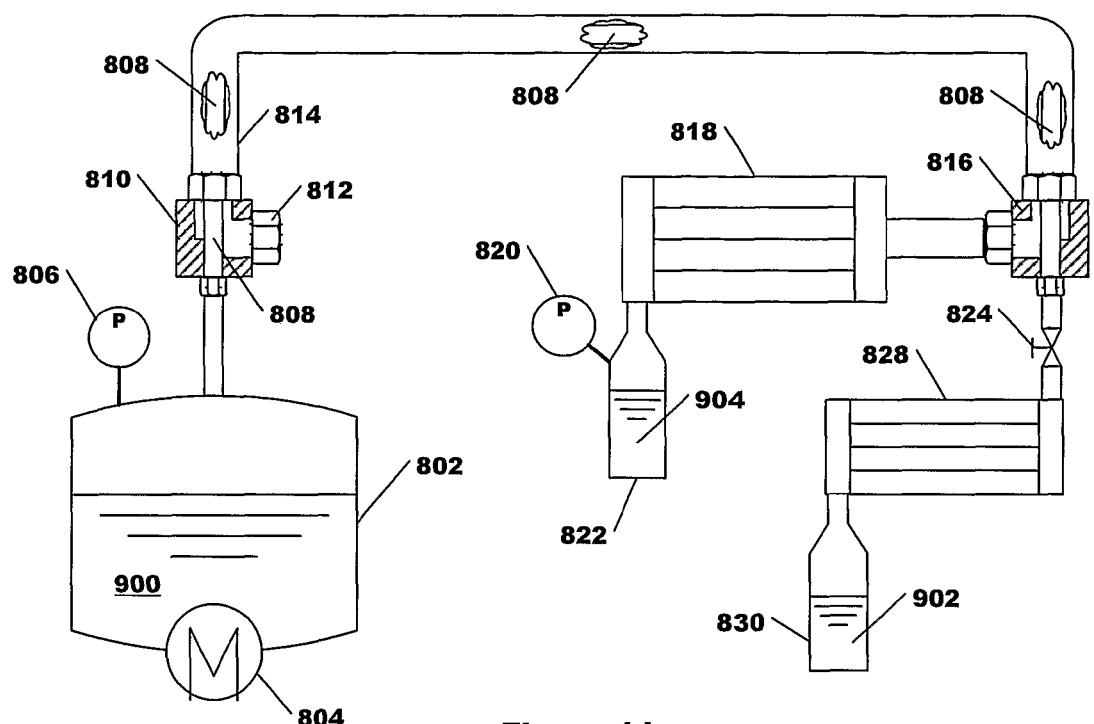
FIG. 11 is a schematic view of the apparatus constructed to measure the production rate and purity of steam purified by a PFSA-TFE copolymer tubular membrane.

The apparatus of FIG. 11 was constructed to measure the production rate and purity of steam purified by a PFSA-TFE copolymer tubular membrane. Boiler 802, constructed of quartz, was heated by a quartz radiant heater 804. Deionized water 900 was boiled in vessel 802 to create a steam feed. Transducer 806 was employed to control and monitor the pressure of the steam feed. The steam feed was delivered to the inside of a Nafion® tube 808 measuring 0.110 inches (2.794 mm) OD with a wall thickness of 0.012 inches (0.3048 mm). Tube 808 had a length of 40 inches (1.016 m). Both ends of the Nafion® membrane tube 808 were terminated in bore through reducing tees 810 and 816. Membrane tube 808 was enclosed within a ¼" (6.35 mm) Tefzel® outer tube 814 which was also terminated at each of Tefzel® tees 810 and 816. The steam feed was purified by transport from the inside of Nafion® tube 808, through its wall, to the annular region between the outer diameter of tube 808 and the inner diameter of outer tube 814. Purified steam exiting tee 816 was condensed in condenser 818 and collected as purified water 904 in container 822. A continuous purge of the steam feed was allowed to flow through control valve 824 into condenser 828. Adjustment of control valve 824 also provided control of the system boiling pressure and the back pressure within Nafion® tube 808. It was also verified that complete closure of valve 824 resulted in the reduction and eventually the termination of the purified steam into condenser 818. Condensed samples 902 of the impure steam were collected in container 830 for further analysis.

Table 1 shows a chemical analysis of the purified steam 904, bottoms 900, and steam feed to membrane 902, of the foregoing example. Analysis was performed by ICP-MS (inductively coupled plasma-mass spectrometry), and concentrations are reported in ppb (parts per billion).

TABLE 1

| ELEMENTS | Detection Limits | Bottoms (900) | Steam Feed to Membrane (902) | Purified Steam (904) |
|---|---|---|---|---|
| Aluminum | 0.020 | 34 | <0.02 | 0.027 |
| Antimony | 0.010 | 1.1 | <0.01 | <0.01 |
| Arsenic | 0.020 | <0.2 | <0.02 | <0.02 |
| Barium | 0.005 | 7.1 | <0.005 | <0.005 |
| Beryllium | 0.030 | <0.1 | <0.03 | <0.03 |
| Bismuth | 0.010 | <0.1 | <0.01 | <0.01 |
| Boron | 0.10 | 83 | 0.26 | 0.42 |
| Cadmium | 0.010 | 1.1 | <0.01 | <0.01 |
| Calcium | 0.10 | 530 | <0.1 | <0.1 |
| Chromium | 0.030 | 0.81 | <0.03 | <0.03 |
| Cobalt | 0.010 | 0.80 | <0.01 | <0.01 |
| Copper | 0.020 | 53 | <0.02 | <0.02 |
| Gallium | 0.010 | <0.1 | <0.01 | <0.01 |
| Germanium | 0.020 | <0.5 | <0.02 | <0.02 |
| Gold | 0.050 | <0.2 | <0.05 | <0.05 |
| Iron | 0.050 | 40 | <0.05 | <0.05 |
| Lead | 0.010 | 11 | <0.01 | <0.01 |
| Lithium | 0.010 | 0.25 | <0.01 | <0.01 |
| Magnesium | 0.020 | 84 | <0.02 | <0.02 |
| Manganese | 0.030 | 24 | <0.03 | <0.03 |
| Molybdenum | 0.020 | 0.53 | <0.02 | <0.02 |
| Nickel | 0.030 | 64 | <0.03 | <0.03 |
| Niobium | 0.020 | <0.1 | <0.02 | <0.02 |
| Potassium | 0.060 | 470 | 1.1 | 0.26 |
| Silver | 0.020 | <0.1 | <0.02 | <0.02 |
| Sodium | 0.050 | 480 | 3.0 | 0.34 |
| Strontium | 0.010 | 4.1 | <0.01 | <0.01 |
| Tantalum | 0.020 | <0.1 | <0.02 | <0.02 |
| Thallium | 0.010 | <0.1 | <0.01 | <0.01 |
| Tin | 0.010 | 1.5 | <0.01 | <0.01 |
| Titanium | 0.050 | <0.2 | <0.05 | <0.05 |
| Vanadium | 0.010 | 0.11 | <0.01 | <0.01 |
| Zinc | 0.030 | 66 | <0.03 | <0.03 |
| Zirconium | 0.010 | 0.15 | <0.01 | <0.01 |

The "bottoms" or source water 900 shows significant concentrations of almost all of the 34 elements tested. The steam feed used in this Example shows three elements above the detection limits: boron at 0.26 ppb; potassium at 1.1 ppb; and sodium at 3.0 ppb. The purified steam 904 analysis showed significant reductions in potassium and sodium. It is also expected that dissolved gases such as oxygen, $CO_2$, and nitrogen are also being removed from the impure steam. This is indirectly confirmed through the observation that the steam permeation rate falls to zero when the purge flow is stopped, very likely due to the accumulation of inert gases which cannot exit the system by passing though membrane.

EXAMPLE 2

Linear Relationship Between Pressure Differential and Permeation Rate

In reference to Example 1, FIG. 8 is a chart of Upstream Pressure versus Purified Steam Flow Rate for the apparatus of FIG. 11. The upstream pressure is the absolute pressure of the impure steam, approximately equal to the pressure in the boiler 802. The pressure differential across the membrane tube 808 is approximately equal to this pressure minus the pressure inside outer tube 814, which for the conditions of the example is the vapor pressure of water at the temperature of the cooling water in condenser 818. The temperature of the cooling water in condenser 818 was 25° C., providing a pressure of about 23 Torr absolute pressure. By subtracting 23 Torr from the upstream pressure of FIG. 8, one can compute the pressure differential across the Nafion® membrane tube. This computation shows an approximate linear relationship between the pressure differential across the membrane and the purified steam flow rate. At 200 Torr pressure drop, steam flow rate was measured at about 1 g/min or 0.036 g/min-cm$^2$. At a pressure differential of about 950 Torr, the steam flow rate was increased to about 0.113 g/min-cm$^2$. This data confirms that NAFION® PFSA-TFE copolymer membranes can be used effectively at temperatures above 100° C. (saturated steam at 950 Torr is at a temperature of about 106° C.).

EXAMPLE 3

Relationship Between Purging Headspace and Permeation Rate

Figure 12:
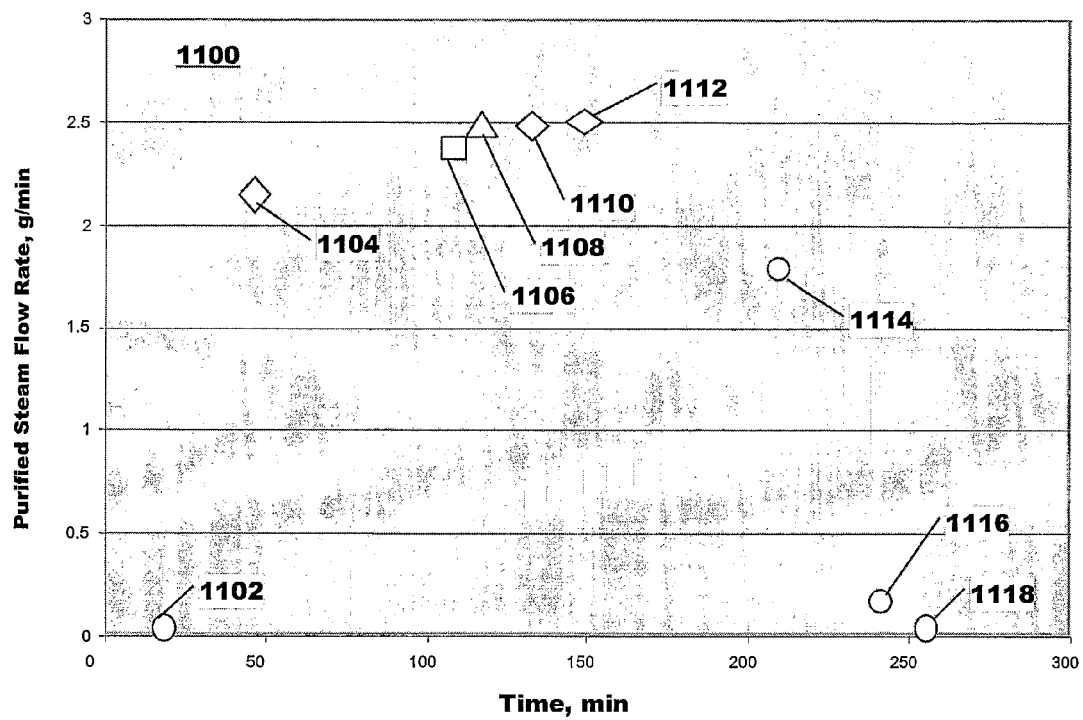
FIG. 12 is a chart of Purified Steam Flow Rate versus Time as a function of valve open status for the apparatus of FIG. 11.

In reference to Example 1, FIG. 12 is a chart depicting Purified Steam Flow Rate versus Time as a function of valve 824 open status, for the apparatus of FIG. 11. This chart illustrates the impact of the purge rate $F_e$ on the permeation rate $F_p$ of purified steam. The chart shows the results of a test where the flow resistance of valve 824 in the apparatus of FIG. 11 was varied from a closed position, to multiple open positions, over a period of time from about 20 minutes to about 260 minute. At data point 1102, Time=20 minutes, valve 824 is closed, and no purified steam is generated. At data point 1104 Time 40 minutes, valve 824 is opened 2 turns, and the purified steam production rate goes to 2.1 g/min. At data point 1106 Time=110 minutes, valve 824 is opened 2 additional turns to 4 turns, and the steam production rate increases to 2.4 g/min. At data point 1108 Time=120 minutes, valve 824 is opened 2 additional turns to 6 turns, increasing the steam production rate to 2.5 g/min. At data points 1110 Time 140 minutes and 1112 Time=155 minutes, valve 824 is closed to 2 turns open, with no change in the steam production rate of 2.5 g/min. This data indicates that a minimum purge rate exists to produce a maximum purified steam production rate. Beyond this minimum rate, no further increase in the rate of purified steam was observed.

At data points 1114-1118 (greater than Time=200 minutes), valve 824 is fully closed. As can be seen in the chart, the steam production rate drops from the maximum 2.5 g/min down to zero over a period of 50 minutes. These results support the hypothesis that as the concentration of volatile impurities near the surface increases, access to the membrane is hindered. Hence, the convective transport of steam is constricted.

EXAMPLE 4

Urea Removal

The apparatus of FIG. 11, as described above in Example 1, was constructed to measure the production rate and purity of steam spiked with urea and purified by a PFSA-TFE copolymer tubular membrane. Condensed samples of the impure steam were collected analysis. The initial DI water 900 was spiked with 2200 ppb Urea and 1468 ppt Ammonium. The purified steam was found to contain 2.6 ppb Urea and 116 ppt. The results are shown in Table 2.

TABLE 2

|  | Urea(ppb) | Ammonium(ppt) |
|---|---|---|
| Lower Detection Limit | 1 | 20 |
| Initial Solution Sample | 2200 | 1468 |
| Condensate Sample | 48 | 1117 |
| Permeate Sample | 2.6 | 116 |
| Final Solution Sample | 10000 | 217247 |

EXAMPLE 5

Subatmospheric Permeation Rates

An experiment was conducted to examine purified steam delivery flow rates at sub atmospheric pressures. A Steam Purifier Assembly (SPA) consisted of one 5R lumen within a 3/8" (9.525 mm) OD×5/16" (7.94 mm) ID Teflon® tube. The lumen was 10.45" (0.265 m) long and was fitted with 0.75" (18.8 mm) long nylon sleeves. The exposed length of the membrane was 8.95" (0.227 m). Both sleeved ends were fed into 3/8" (9.525 mm) PTFE rods with their centers drilled out. Both rods were attached to the ends of the 3/8" (9.525 mm) Teflon tube with a 3/8" (9.525 mm) Plasmatech tee and a 3/8" (9.525 mm) Plasmatech union. The branch from the tee was the permeate outlet. The SPA unit was insulated. FIG. 2 is a schematic of the manifold used for this experiment. The humidifier was in a horizontal position throughout the test. A Rasirc Intaeger steam generator was used to provide steam to the SPA. The tubing between the Intaeger and the SPA was insulated. A MKS 621C13TBFHC pressure transducer was placed at the SPA's permeate outlet to monitor the pressure. The permeate and condensate were sent through condensers to covert the water back into a liquid state. The chiller used to cool the condensers was set for 5° C. Varian 949-9411 diaphragm vacuum pumps were used to create pressures below 760 Torr on both the condensate and permeate side of the system. Valve 7 was used to control the pressure on the permeate side. The ballasts were used to collect water and stabilize the pressure. A collection tube was downstream of the permeates condenser to trap the water for measurement. Nitrogen was used to pressurize the collection tube to force the water out. Nitrogen was purified with an Aeronex 500KF I-series Purifier and its pressure in the collection tube was maintained at 5 pounds per square inch (psig) with a Veriflow pressure regulator. The water amount was weighed with a My Weigh i1200 scale.

For the sample collection, the following method was performed. Valve 1 and 4 were used to provide pathways for the pump to pull vacuum on the system. To begin sample collection, Valve 1 was closed and Valve 2 was opened. This allowed a pathway for the water to pour into the collection tube. Once the water was collected for a set amount of time, Valve 2 and Valve 4 were closed to isolate the collection tube and Valve 1 was opened. Valve 3 was opened to pressurize the collection tube. Once pressurized, Valve 5 was opened to empty the water into a beaker. When the collection tube was emptied, Valve 3 was closed followed by Valve 5. Valve 4 was then opened slowly to reduce the destabilization of the permeate side's pressure.

Initial testing was conducted with the boiler's pressure under 760 Torr. The desired permeate side pressures during this step were 40 and 100 Torr. The results (FIG. 3) show a logarithmic relationship between the flow rate and pressure difference at both of these pressures.

In subsequent tests, the boiler's pressure was raised while the pressure on the permeate side was maintained at approximately 200 Torr. The range was increased to develop a fuller model of the permeation of steam through the membrane. As previously observed, a logarithmic relationship between the flow rate and pressure difference is shown (FIG. 3).

The overall result indicates that the relationship between flow rate and pressure differential is maintained independent of the individual boiler and permeate side pressures. The linear regression from this data is $0.6407*Ln(x)-2.0452$ ($R^2=0.9679$).

FIG. 3 shows the subatmospheric permeation rate for the NAFION® PFSA-TFE copolymer membranes. This test was run at subatmospheric pressure with the downstream pressure held at about 35 Torr. Boiler pressure was raised from 40 Torr to above 1000 Torr. The permeate collected ranged from zero to 2.5 grams/min. The relationship was initially linear and became log rhythmic moving towards a maximum valve or 2.5 grams per minute

EXAMPLE 6

Membrane Leak Rate

Figure 13:
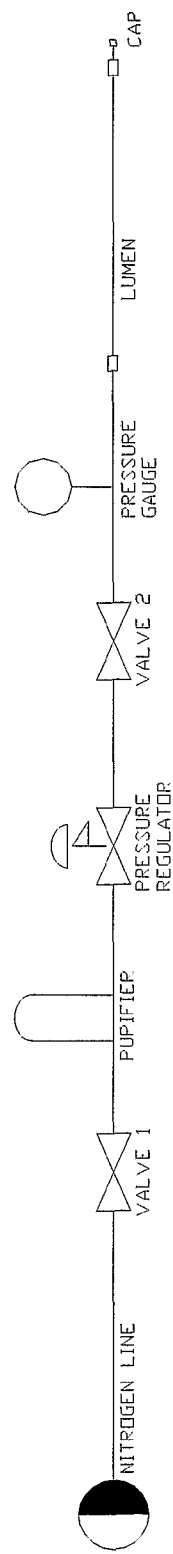
FIG. 13 is a schematic of the test apparatus used for membrane leak testing.

An experiment was conducted to examine the gas impermeable properties of PFSA-TFE ion exchange membranes. FIG. 13 is a diagram of the experimental setup. Nitrogen was added to the system with valve 1. The nitrogen was then purified using a 100K Aeronex inert gas purifier. The pressure within the hydrolyzed membrane was controlled with an APtech pressure regulator. Valve 2 separated the pressure regulator and the 100 psi pressure gauge allowing the internal pressure of the membrane to be monitored. The hollow fiber membranes were fitted with 1/8" (3.175 mm) Teflon® sleeves on both ends so the Plasmatech fittings can be used to attach the membrane to the system.

The pressure inside the lumen was slowly brought to 30 psig using the pressure regulator. The lumen was placed under water to check for leaks. Snoop® was used to check all connections for leaks. Once it was clear that there were no leaks in the system, the pressurized lumen and pressure gauge were isolated from the rest of the system by closing valve 2. The lumen pressure was then monitored. This test was done on a 5R 3/8" (9.525 mm) OD×5/16" (7.94 mm) ID (8.7" (0.221 m) exposed) membrane. The lumen was left under pressure for 64 hours and 48 minutes.

The 8.7" (0.221 m) 5R lumen had a leak rate $1.72E-09$ $cm^3/cm^2/s$. In subsequent tests, two 6" 5R lumens were tested side by side. The weights of the lumens were 0.337 g and 0.351 g. After being fitted with sleeves, the 0.337 g and 0.351 g membranes had exposed lengths of 4.1" (10.4 cm) and 4.2" (10.7 cm) respectively. Corresponding leak rates of $1.16E-09$ $cm^3/cm^2/s$ and $2.418E-09$ $cm^3/cm^2/s$ were observed. While this test is somewhat rudimentary, the results demonstrate the nitrogen gas impermeable nature of PFTA-TFE membranes.

All references cited herein, including but not limited to published and unpublished applications, patents, and literature reference, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A method of purifying steam, comprising:
providing a steam feed containing at least one impurity, wherein the steam feed is at least 90% by weight water, and wherein the steam feed is saturated; and
contacting the steam feed with a first surface of a substantially gas-impermeable ion exchange membrane and obtaining a purified steam as a flow from an opposing second surface of the substantially gas-impermeable ion exchange membrane, wherein the substantially gas-impermeable ion exchange membrane is more permeable to water vapor than to the impurity, wherein the substantially gas-impermeable ion exchange membrane has a nitrogen gas leak rate of less than $10^{-3}$ $cm^3/cm^2/s$ under standard temperature and pressure, and wherein the ion exchange membrane includes chemical groups capable of combining with ions or exchanging ions between the ion exchange membrane and an external surface.

2. The method of claim 1, wherein the purified steam is at a sub-atmospheric pressure.

3. The method of claim 1, wherein the ion exchange membrane comprises a functional group selected from the group consisting of sulfonic acid, carboxylic acid, phenol, and salts thereof.

4. The method of claim 1, wherein the chemical groups include a component selected from the group consisting of an inorganic oxide, a fluorine-containing polymer, a copolymer of perfluorinated ethylene and a perfluorinated vinyl comprising an acid group, and salts thereof.

5. The method of claim 1, wherein the salts are selected from the group consisting of alkali metal salts, alkaline earth metal salts, and combinations thereof.

6. The method of claim 1, wherein the impurity is an impurity gas, and wherein the membrane has a ratio of water vapor permeability to an impurity gas permeability of at least 100:1.

7. The method of claim 1, wherein the steam feed comprises a purge flow portion that does not substantially pass through the membrane.

8. The method of claim 7, wherein a rate of the purge flow is maintained continuously.

9. The method of claim 7, wherein a rate of the purge flow is maintained intermittently.

10. The method of claim 1, wherein the membrane is supported by a porous support contacting the second surface of the membrane.

11. The method of claim 1, wherein the steam feed is contacted with an array of substantially gas-impermeable ion exchange membranes, wherein the array comprises an array of hollow fiber membranes or an array of planar sheet membranes, and wherein the membranes in the array are positioned substantially parallel to each other.

12. The method of claim 1, wherein the purified steam has a purity of at least about 99.9% by weight.

13. The method of claim 1, wherein the purified steam contains not more than 1 ppm of the impurity.

14. The method of claim 1, wherein the impurity comprises at least one species selected from the group consisting of borate, silicate, phosphate, sulfate, an organic species, a metallic species, ammonia, urea, nitrogen, oxygen, carbon monoxide, carbon dioxide, hydrogen, methane, ethane, hydrocarbons, hydrogen sulfide, $SO_x$, $NO_x$, erotic polar species, alkaline species, particulate species, and biologically active material.

15. The method of claim 14, wherein the biologically active material is selected from the group consisting of mold, mold spores, prions, viruses, allergens, proteins, and bacteria.

16. The method of claim 1, wherein the impurity is an impurity gas.

17. The method of claim 1, wherein the steam feed is at an operating temperature of from about 20° C. to 150° C.

18. The method of any one of claims 1-17, further comprising a step selected from the group consisting of:
growing an oxide on a semiconductor surface using the purified steam;
removing photoresist from a semiconductor wafer using the purified steam;
removing contamination from a semiconductor wafer using the purified steam;
recovering petroleum using the purified steam;
removing contamination from exhausted steam prior to release into the environment using the purified steam;
directly venting the purified steam to atmosphere, wherein the steam feed is exhaust steam comprising the impurity;
using the purified steam in the manufacture of a pharmaceutical composition; and
converting the purified steam to ultrapure water for use in the manufacture of a pharmaceutical composition.

19. A system for purifying steam, comprising:
a source of a steam feed, wherein the source is configured to provide a steam feed containing at least one impurity, wherein the steam feed is at least 90% by weight water, and wherein the steam feed is saturated;
a first passageway for directing the steam feed to a first surface of at least one substantially gas-impermeable ion exchange membrane, wherein the substantially gas-impermeable ion exchange membrane is more permeable to water vapor than to the impurity, wherein the membrane has a nitrogen gas leak rate of less than $10^{-3}$ $cm^3/cm^2/s$ under standard temperature and pressure, and wherein the ion exchange membrane includes chemical groups capable of combining with ions or exchanging ions between the ion exchange membrane and an external surface;
a second passageway for directing a purified steam away from an opposing surface of the substantially gas-impermeable ion exchange membrane; and
a third passageway to direct a purge flow of the steam feed away from the membrane.

20. The system of claim 19, further comprising a heater, a pressure transducer and a controller configured to maintain a preselected differential pressure across the membrane.

21. The method of claim 1, wherein the steam feed has a purity up to about 99% by weight.

22. The method of claim 1, wherein the purified steam has a purity greater than about 99.99999% water by weight.

23. The method of claim 1, wherein the impurity is an impurity gas, and wherein the membrane has a ratio of water vapor permeability to an impurity gas permeability of at least 1000000:1.

24. The method of claim 1, wherein the purified steam contains not more than 1 ppt of the impurity.

25. The method of claim 1, wherein providing a steam feed comprises providing a steam feed from deionized water.

26. The method of claim 1, wherein the impurity comprises silicate.

27. The method of claim 1, wherein the substantially gas-impermeable ion exchange membrane has a hollow tube shape.

28. The method of claim 1, wherein the substantially gas-impermeable ion exchange membrane comprises a plurality of substantially gas-impermeable ion exchange membranes.

29. The method of claim 28, wherein the plurality of substantially gas-impermeable ion exchange membranes each have a hollow tube shape.

30. The method of claim 28, wherein the plurality of substantially gas-impermeable ion exchange membranes are substantially parallel.

31. The method of claim 29, wherein the plurality of substantially gas-impermeable ion exchange membranes are substantially parallel.

32. The system of claim 19, wherein the substantially gas-impermeable ion exchange membrane has a hollow tube shape.

33. The system of claim 19, wherein the substantially gas-impermeable ion exchange membrane comprises a plurality of substantially gas-impermeable ion exchange membranes.

34. The system of claim 33, wherein the plurality of substantially gasimpermeable ion exchange membranes each have a hollow tube shape.

35. The system of claim 33, wherein the plurality of substantially gasimpermeable ion exchange membranes are substantially parallel.

36. The system of claim 34, wherein the plurality of substantially gasimpermeable ion exchange membranes are substantially parallel.

* * * * *